United States Patent
Guy et al.

(10) Patent No.: US 10,544,028 B2
(45) Date of Patent: Jan. 28, 2020

(54) BEVERAGE DISPENSING CONTAINER, APPARATUS, SYSTEM AND METHOD

(71) Applicant: Pernod Ricard SA, Paris (FR)

(72) Inventors: Ian Allan Guy, Paris (FR); Sarah Helen Liddell, Paris (FR); Steven John Kelly, Paris (FR); James Ashley Gadd, Paris (FR); Tom Foran, Paris (FR); Alain Duffosse, Paris (FR); Vlastimil Spelda, Paris (FR); Amaury Cointreau, Paris (FR)

(73) Assignee: Pernod Ricard SA, Paris (FR)

( * ) Notice: Subject to any disclaimer, the term of this patent is extended or adjusted under 35 U.S.C. 154(b) by 158 days.

(21) Appl. No.: 15/108,502

(22) PCT Filed: Dec. 23, 2014

(86) PCT No.: PCT/EP2014/079246
§ 371 (c)(1),
(2) Date: Jun. 27, 2016

(87) PCT Pub. No.: WO2015/101573
PCT Pub. Date: Jul. 9, 2015

(65) Prior Publication Data
US 2016/0297666 A1    Oct. 13, 2016

(30) Foreign Application Priority Data

Dec. 30, 2013    (GB) .................................... 1323126.1
Nov. 3, 2014    (GB) .................................... 1419589.5

(51) Int. Cl.
*B67D 1/08*    (2006.01)
*B67D 1/00*    (2006.01)
(Continued)

(52) U.S. Cl.
CPC ......... *B67D 1/0888* (2013.01); *B67D 1/0085* (2013.01); *B67D 1/0462* (2013.01);
(Continued)

(58) Field of Classification Search
CPC .......... G05B 15/02; G07F 9/026; G07F 13/02
See application file for complete search history.

(56) References Cited

U.S. PATENT DOCUMENTS

| | | |
|---|---|---|
| 1,710,658 A | 4/1929 | George |
| 2,644,663 A | 7/1953 | Klingler |

(Continued)

FOREIGN PATENT DOCUMENTS

| | | |
|---|---|---|
| DE | 1486403 A1 | 5/1969 |
| EP | 0266067 A1 | 5/1988 |

(Continued)

*Primary Examiner* — Robert E Fennema
*Assistant Examiner* — Santosh R Poudel
(74) *Attorney, Agent, or Firm* — Gable Gotwals

(57) ABSTRACT

The present invention is directed to a beverage dispensing system including at least one beverage dispensing container, a computing device and a base unit upon or within which, in use, the at least one container is positioned. The at least one container includes a reservoir of beverage, a communication element for storing data indicative of contents of the beverage dispensing container, a manually actuatable dispensing valve selectively controlling flow of beverage from the reservoir to a container outlet, and pressurizing means for pressurizing beverage against the dispensing valve such that when the dispensing valve is opened beverage flows from the reservoir and out the container outlet. The base unit includes at least one base-container transceiver for wirelessly reading data from and writing data to the communication element, at least one base-device transceiver for wirelessly communicating with the computing device, and a control unit controlling communication of data from the (Continued)

computing device to the communication element and vice-versa.

26 Claims, 18 Drawing Sheets

(51) Int. Cl.
*B67D 1/04* (2006.01)
*G05B 15/02* (2006.01)

(52) U.S. Cl.
CPC ......... *B67D 1/0801* (2013.01); *B67D 1/0891* (2013.01); *G05B 15/02* (2013.01); *B67D 2001/0098* (2013.01); *B67D 2001/0818* (2013.01); *B67D 2210/00034* (2013.01)

(56) References Cited

U.S. PATENT DOCUMENTS

| | | | |
|---|---|---|---|
| 3,067,787 A | 5/1959 | Salk | |
| 3,294,289 A | 12/1966 | Bayne et al. | |
| 3,647,117 A | 3/1972 | Hargest | |
| 4,606,476 A * | 8/1986 | Pocock | B67D 1/07 134/169 R |
| 4,765,512 A | 8/1988 | Bull, Jr. | |
| 4,800,492 A | 1/1989 | Johnson et al. | |
| 4,836,404 A | 6/1989 | Coy | |
| 4,850,971 A | 7/1989 | Colvin | |
| 4,948,092 A | 8/1990 | Kasper et al. | |
| 5,074,341 A | 12/1991 | Credle, Jr. et al. | |
| 5,085,349 A | 2/1992 | Fawcett | |
| 5,800,339 A | 9/1998 | Salama | |
| 6,135,311 A | 10/2000 | Panec et al. | |
| 6,978,916 B2 * | 12/2005 | Smith | B65D 83/425 141/20 |
| 8,844,766 B2 * | 9/2014 | Zaima | A61L 2/26 222/52 |
| 2001/0043256 A1 | 11/2001 | Seccombe et al. | |
| 2001/0054083 A1 | 12/2001 | Defosse | |
| 2002/0017528 A1 | 2/2002 | Stillinger et al. | |
| 2002/0092858 A1 | 7/2002 | Bowman | |
| 2002/0092877 A1 | 7/2002 | Bowman | |
| 2003/0168462 A1 | 9/2003 | Kiyota | |
| 2003/0222238 A1 | 12/2003 | Getzewich et al. | |
| 2004/0159820 A1 | 8/2004 | Yang | |
| 2005/0029313 A1 | 2/2005 | Robins et al. | |
| 2005/0034606 A1 | 2/2005 | In Albon | |
| 2005/0121464 A1 | 6/2005 | Miller et al. | |
| 2005/0184075 A1 | 8/2005 | Belcastro | |
| 2006/0118581 A1 * | 6/2006 | Clark | B01F 13/1055 222/333 |
| 2006/0196574 A1 | 9/2006 | Schroeder et al. | |
| 2006/0201955 A1 | 9/2006 | Stribling et al. | |
| 2007/0145072 A1 | 6/2007 | Cook et al. | |
| 2007/0194045 A1 | 8/2007 | Py et al. | |
| 2009/0069934 A1 | 3/2009 | Newman | |
| 2009/0169419 A1 * | 7/2009 | Hyde | A61L 2/04 422/1 |
| 2010/0125362 A1 * | 5/2010 | Canora | G06Q 20/3278 700/236 |
| 2010/0256826 A1 * | 10/2010 | Crisp, III | B67D 1/0057 700/283 |
| 2010/0268378 A1 | 10/2010 | Sharpley | |
| 2011/0023994 A1 * | 2/2011 | Meinzinger | B67C 3/02 141/1 |
| 2011/0100666 A1 * | 5/2011 | Wu | H05K 7/20872 174/15.1 |
| 2011/0253746 A1 | 10/2011 | O'Keefe, Jr. | |
| 2012/0168450 A1 | 7/2012 | Samson | |
| 2012/0218106 A1 * | 8/2012 | Zaima | A61L 2/26 340/540 |
| 2012/0240782 A1 | 9/2012 | Yang | |
| 2012/0245729 A1 * | 9/2012 | Wegelin | G01F 15/063 700/231 |
| 2013/0062366 A1 | 3/2013 | Tansey | |
| 2013/0085600 A1 * | 4/2013 | Nicol | G06Q 30/06 700/236 |
| 2013/0181005 A1 | 7/2013 | Stribling et al. | |
| 2014/0053944 A1 * | 2/2014 | Wang | B67C 3/007 141/1 |
| 2014/0053950 A1 * | 2/2014 | Vandersteen | G07F 11/002 141/83 |
| 2014/0114469 A1 * | 4/2014 | Givens | B67D 1/0041 700/232 |

FOREIGN PATENT DOCUMENTS

| | | |
|---|---|---|
| EP | 0276994 A2 | 8/1988 |
| EP | 0726225 A1 | 8/1996 |
| FR | 2887458 A1 | 12/2006 |
| GB | 2002321 A | 2/1979 |
| GB | 2171383 A | 8/1986 |
| GB | 2279130 A | 12/1994 |
| GB | 2503259 A | 12/2013 |
| JP | H1191798 | 4/1999 |
| JP | 2009533216 A | 9/2009 |
| JP | 2010537911 A | 12/2010 |
| JP | 2011020709 | 2/2011 |
| KR | 20030062284 | 7/2003 |
| WO | 9623703 A1 | 8/1996 |
| WO | 0117892 A2 | 3/2001 |
| WO | 0149580 A1 | 7/2001 |
| WO | 0183360 A2 | 11/2001 |
| WO | 02092462 A1 | 11/2002 |
| WO | 03101261 A1 | 12/2003 |
| WO | 2006110714 A2 | 10/2006 |
| WO | 2008022097 A1 | 2/2008 |
| WO | 2008030623 A2 | 3/2008 |
| WO | 2009032911 A1 | 3/2009 |
| WO | 2011029813 A1 | 3/2011 |
| WO | 2012024045 A1 | 2/2012 |
| WO | 2013031723 A1 | 3/2013 |
| WO | 2013163856 A1 | 11/2013 |

\* cited by examiner

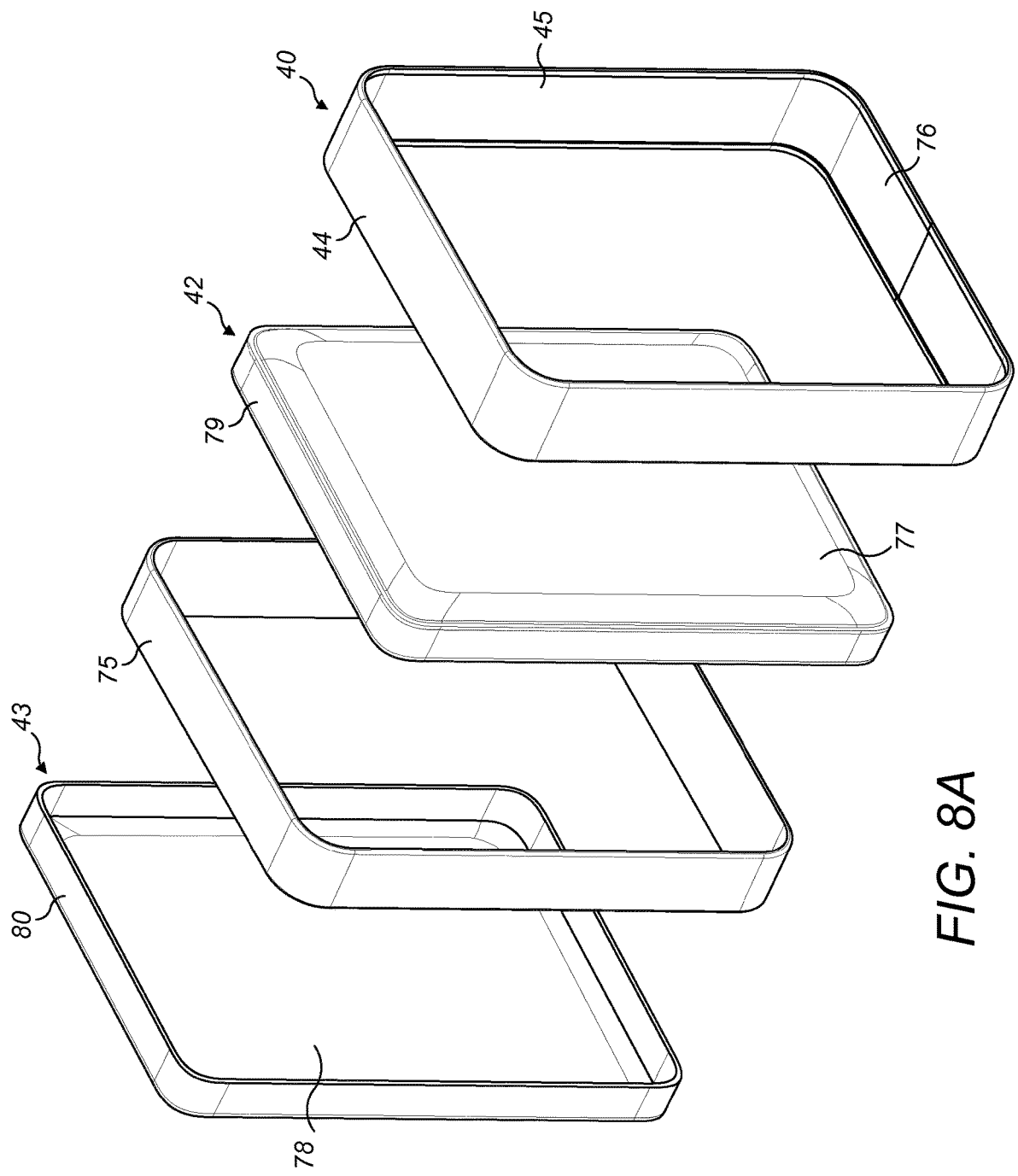

BEVERAGE DISPENSING CONTAINER, APPARATUS, SYSTEM AND METHOD

CROSS-REFERENCE TO RELATED APPLICATIONS

This United States application is the National Phase of PCT Application No. PCT/EP2014/079246 filed 23 Dec. 2014, which claims priority to British Patent Application No. 1323126.1 filed 30 Dec. 2013 and to British Patent Application No. 1419589.5 filed 3 Nov. 2014, each of which is incorporated herein by reference.

TECHNICAL FIELD

This invention is directed towards a beverage dispensing container, system, apparatus and method, which are particularly suitable for alcoholic beverages.

BACKGROUND

Beverages, for example alcoholic beverages, sodas, concentrates and the like, are commonly supplied individually to consumers in bottles and typically glass bottles. However, glass bottles utilise space inefficiently when stacked, are relatively heavy and can be broken relatively easily when subjected to an impact. Therefore, they are not particularly suited to transportation. Furthermore, when a bottle is opened air is able to contact the beverage, which may result in the evaporation of the beverage and/or causing the beverage to degrade. For example, the alcohol in an alcoholic beverage will evaporate, thereby reducing the alcoholic content of the beverage. The air may also oxidise the alcohol such that the taste of the beverage changes.

Bag-in-box type containers commonly prevent air from contacting the beverage by comprising a one-way valve which allows beverage to flow out of, but prevents air from flowing into, the bag. However, such bag-in-box containers are not considered to be premium products by consumers and have, as a result, not replaced glass bottles as the typical beverage container. The bag-in-box type containers are also commonly very large (e.g. 3 to 5 litres) and are not suited to storing beverages, such as liquors, which are commonly supplied only in relatively small quantities (e.g. 1 litre). The box is also typically formed of cardboard or the like and thus has a relatively low structural strength. Therefore, they are not suited to vertical stacking in large numbers.

SUMMARY OF INVENTION

The present invention is directed towards a beverage dispensing system comprising: at least one beverage dispensing container, the at least one container comprising: a reservoir of beverage; a communication element having storage means storing data indicative of the contents of the particular beverage dispensing container; a manually actuatable dispensing valve for selectively controlling the flow of beverage from the reservoir to a container outlet; and pressurising means arranged to pressurise the beverage against the dispensing valve such that when the dispensing valve is opened beverage flows from the reservoir and out of the container outlet; a computing device; a base unit upon or within which, in use, the at least one container is positioned, the base unit comprising: at least one base-container transceiver for wirelessly reading data from and writing data to the communication element; and at least one base-device transceiver for wirelessly communicating with the computing device; and a control unit for controlling the communication of data from the computing device to the communication element and vice-versa.

The present invention further provides a method of operating a beverage dispensing system, said system comprising: at least one beverage dispensing container, the at least one container comprising a reservoir of beverage, a communication element having storage means, a manually actuatable dispensing valve for selectively controlling the flow of beverage from the reservoir to a container outlet, and pressurising means arranged to pressurise the beverage against the dispensing valve such that when the dispensing valve is opened beverage flows from the reservoir and out of the container outlet; a computing device; a base unit upon or within which, in use, the at least one container is positioned, wherein the method comprises: communicating, from the communication elements to the base unit and vice-versa, beverage data indicative of contents of the at least one beverage dispensing container; communicating said beverage data from the base unit to a computing device.

The present disclosure is directed in one aspect towards a beverage dispensing container holding a beverage. The container may comprise a band mounted with first and second walls to form an enclosure therebetween. In embodiments of the invention the beverage dispensing container comprises a passive, semi-active or active communication element containing information on the beverage contained in the beverage dispensing container. The communication element can interact with a mobile communication device.

The beverage dispensing container is suitable for containing alcoholic beverages and is particularly suitable for containing spirits, such as whisky, vodka, gin, liqueur, coffee liqueur, rum, aniseed-based spirit, pastis, cognac, brandy or tequila. The beverage dispensing container may also be suitable for containing other alcoholic beverages including champagne, wine, beer or cocktails, and/or other types of beverage, including sodas (also known as soft drinks) and beverage concentrates.

The present invention is directed towards a beverage dispensing apparatus in which at least one beverage dispensing container communicates with a base unit. In embodiments of the disclosure, the at least one beverage dispensing container is controlled from a mobile communication device via the base. The at least one beverage dispensing container may also be operable to dispense beverage independently of the base unit.

The present disclosure also provides a beverage dispensing module comprising: a side wall forming a stiffening member; a front wall and a back wall mounted with the side wall to form an enclosure therebetween, the enclosure forming or containing a reservoir for holding an alcoholic beverage; and a dispensing valve operable to selectively direct beverage from the reservoir and out of the beverage dispensing module. The front wall and the back wall may be releasably mounted with the side wall. The front wall and the back wall may each be formed of a compliant material. The compliant material may be water resistant. The front wall and the back wall may each be disposable or recyclable. One or both of the front wall and back wall may be formed of cardboard. The side wall may be formed of a rigid material, which may be water resistant and/or recyclable. The side wall may be reusable whereas the front and rear walls may be disposable. The side wall and the front wall may have cooperating members so as to permit at least partial consumer assembly and disassembly of the beverage dispensing container. The side wall and the rear wall may have cooperating members so as to permit at least partial consumer assembly and disassembly of the beverage dispensing container. The front and back walls of the module may constitute a major proportion of the total surface area of the container and the side wall may provide a minor proportion of the total surface area of the container. The dispensing valve may be located upon or through the side wall of the module. The side wall may be contiguous. The side wall may form a rigid hoop extending in a first, circumferential direction and in a second, generally orthogonal thickness direction between the front and rear faces of the module, the rigid hoop defining or containing the reservoir. The rigid hoop may define front and rear rim edges extending in the said circumferential direction around the hoop, the front and rear walls of the module each comprising generally planar surfaces dimensioned so as to engage, respectively, with the front and rear rim edges of the rigid hoop. The front and rear rim edges of the rigid hoop may each include a lip extending away from the rim edges, the front and rear walls of the module being compliant so as to permit a snap fit insertion underneath the lips of the rigid hoop rim edges. The side wall may be split so as to allow selective expansion thereof.

The beverage dispensing module may be of a size and shape suitable for insertion through a domestic letter box. The height of the module may be no greater than 400 m, preferably no greater than 280 mm, and most preferably no greater than 230 mm. The thickness of the module may be no greater than 35 mm and preferably no greater than 30 mm. The side, front and rear walls together may define a container of substantially rectangular cuboid form. The beverage dispensing module may comprise alcoholic beverage within the reservoir.

The beverage dispensing module may further comprise a recess, wherein the dispensing valve further comprises a valve body and the valve body is operable to be moved into the recess in a locked position and moved out of the recess into an unlocked position. The beverage dispensing module may further comprise fluid dispensing means for creating an overpressure relative to atmosphere within the reservoir so that, upon opening of the dispensing valve, fluid is urged from the reservoir and out through the dispensing valve. The reservoir may be compressible, the fluid dispensing means including a mechanical arrangement for compressing the reservoir so as to create an overpressure therein. The fluid dispensing means may comprise or include one or more of an elastic member, a spring or other resilient member, a pump, or an hydraulic piston. The fluid dispensing means may include a supply of gas. The reservoir may be compressible, the module further comprising a gas fillable bag, the fluid dispensing means being configured to inject the supply of gas into the gas fillable bag so as to expand the bag, the gas fillable bag being positioned in proximity to the compressible reservoir so that expansion of the bag compresses the reservoir so as to create the said overpressure therein.

The present disclosure further provides a beverage dispensing container defining an enclosure within which is positioned a reservoir containing a beverage to be dispensed, the container further comprising a dispensing valve in fluid communication with the reservoir and operable selectively to direct beverage from the reservoir and out of the beverage dispensing container; and beverage dispensing means arranged selectively to force beverage from the reservoir and out through the dispensing valve when the valve is open; wherein the container is operable in a first, manual mode to cause the beverage dispensing means to force beverage to be dispersed from the reservoir, upon manual activation of the beverage dispensing means by a user, and in a second, automatic mode to cause the beverage dispensing means to force beverage to be dispensed from the reservoir, automatically upon receipt of instructions to do so from a beverage dispensing container controller.

The beverage dispensing container controller may be arranged to receive instructions from a user to dispense beverage, and, upon receipt of such instructions, may be configured to control the beverage dispensing means and, if necessary, the dispensing valve, so as to force beverage from the reservoir and out of the container via the dispensing valve without direct contact with the container by the user. The dispensing valve may have a manually operable valve actuator, actuation of which in the said first manual mode causes beverage to be expelled from the reservoir and out of the dispensing valve. The dispensing valve may have an electronically controlled valve actuator connected d with the controller; actuation of the electronically controlled valve actuator by the controller in the said second automatic mode may cause beverage to be expelled from the reservoir and out of the dispensing valve. The dispensing valve may include a check valve to permit, selectively, beverage to pass therethrough in a dispensing direction from the reservoir and out of the container, but to prevent ingress of fluid in the opposite direction; wherein, in the automatic mode, the controller may be arranged to cause the beverage dispensing means to force beverage through the check valve under pressure when the controller is instructed to dispense the beverage. The controller may be further configured to monitor the volume and/or weight of beverage within the container. The beverage dispensing container controller may be located wholly within the container and may be in communication with an external instruction input device operable by a user to send the said instructions to the controller to dispense the beverage. The controller may be located externally of the container and may be configured for communication with an instruction input device operable by a user to send the said instructions to the controller to dispense the beverage. The instruction input device may be physically or wirelessly connected to the controller. The instruction input device may be physically separate from the controller. The instruction input device may contain a microprocessor and a signal transmitter. The instruction input device may comprise one of a personal computer, a tablet computer, a mobile telephone or a dedicated portable handset.

The present disclosure further provides in combination, the aforementioned beverage dispensing container and a base unit, within which the controller is located, upon or within which the beverage dispensing container is arranged to stand. The base unit may include an actuator under the control of the controller, the actuator being configured so as to actuate the beverage dispensing means within the container when the controller instructs the actuator to do so, the controller having itself received instructions to dispense the beverage.

The present disclosure further provides a beverage dispensing apparatus comprising: (a) one or more beverage dispensing containers each container defining an enclosure within which is positioned a reservoir containing a beverage, each container further comprising a dispensing valve operable to selectively direct beverage from the reservoir and out of the beverage dispensing container; (b)a base unit upon or within which, in use, the or each beverage dispensing may be positioned, the base unit having an input to receive instructions from a user; (c) a beverage dispensing means in communication with the input of the base unit, and with one or both of the reservoir/dispensing valve of the, or at least one of the, beverage dispensing container(s), the beverage dispensing means being configured to cause beverage to be dispensed form the, or a selected one of the beverage dispensing containers, when instructions to do so have been received from the user via the base unit input.

The base unit input may comprise a receiver, the receiver being configured to communicate with the transmitter of a remote user device form which the said user instructions may be sent. A controller may be located within the base unit, the controller being in communication with the receiver and also with the beverage dispensing means whereby, upon receipt by the receiver of instructions from a user, the controller being configured to control the beverage dispensing means to dispense a beverage from the, or a selected one of the beverage dispensing containers.

A memory may be provided, adapted to store data representative of information concerning the contents of the or at least one of the beverage dispensing containers. The memory may comprise storage means associated with the beverage dispensing containers. The memory may comprise a respective storage means mounted upon or within the, or a corresponding one of the, beverage dispensing containers, the respective storage means being arranged to store data indicative of the contents of the particular beverage dispensing container to which or within which it is mounted. The storage means for the or each beverage dispensing container may be configured to store data concerning one or more of the identity of the beverage in that container, a serial number, a current volume and/or weight of beverage in the container, a sale date, a volume of beverage dispensed, a number of individual beverage doses dispensed, and a sale location. The base unit may further comprising a transmitter configured to transmit data held within the memory to a remote location. The remote location may comprise a personal computer, a tablet computer, or a mobile telephone, from which a user may in turn send the instructions to the base unit input. A mobile communication device may be provided having software operating thereon, the software providing a user interface and controlling the transmission of the said instructions to the base unit input.

The present disclosure further provides a method of providing alcoholic beverages to a user comprising the steps of; a mobile communication device receiving beverage information from a communication element of dispensing container for storing an alcoholic beverage; the mobile communication device receiving an order for a new dispensing container containing alcoholic beverage related to the beverage information; transmitting the order to a supplier via a network; selecting and packaging the new dispensing container; and delivering the dispensing container to a user. The beverage information may indicate that the alcoholic beverage in the alcoholic beverage dispensing container is below a predetermined level and the mobile communication device may make the order automatically.

BRIEF DESCRIPTION OF THE DRAWINGS

By way of example only, embodiments of the present invention are now described with reference to, and as show in, the accompanying drawings, in which:

FIG. 8A is a perspective and exploded view of a third embodiment of the beverage dispensing container;

DETAILED DESCRIPTION

Figure 1:
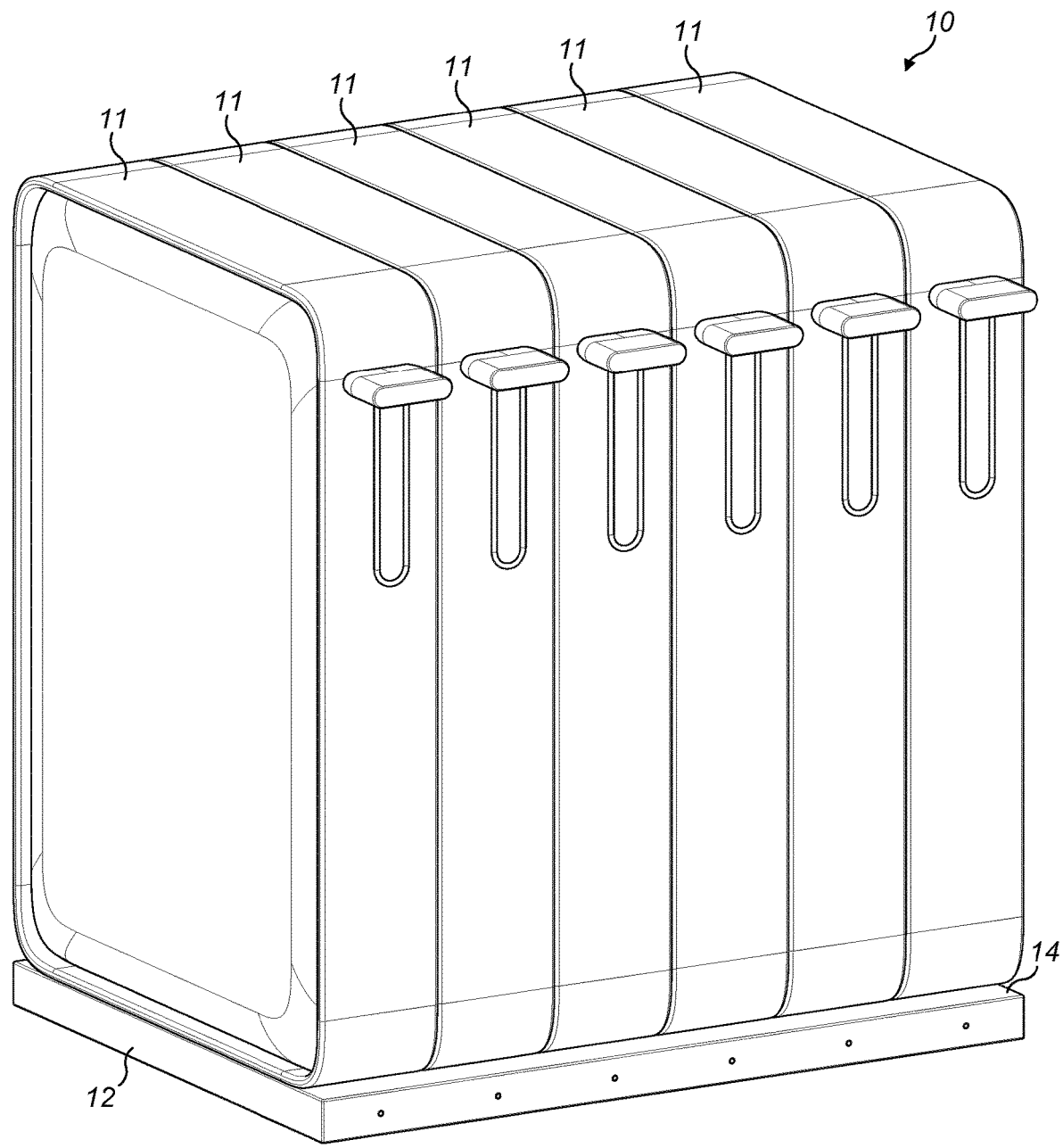
FIG. 1 is a perspective view of a beverage dispensing system of the present invention.
Figure 2:
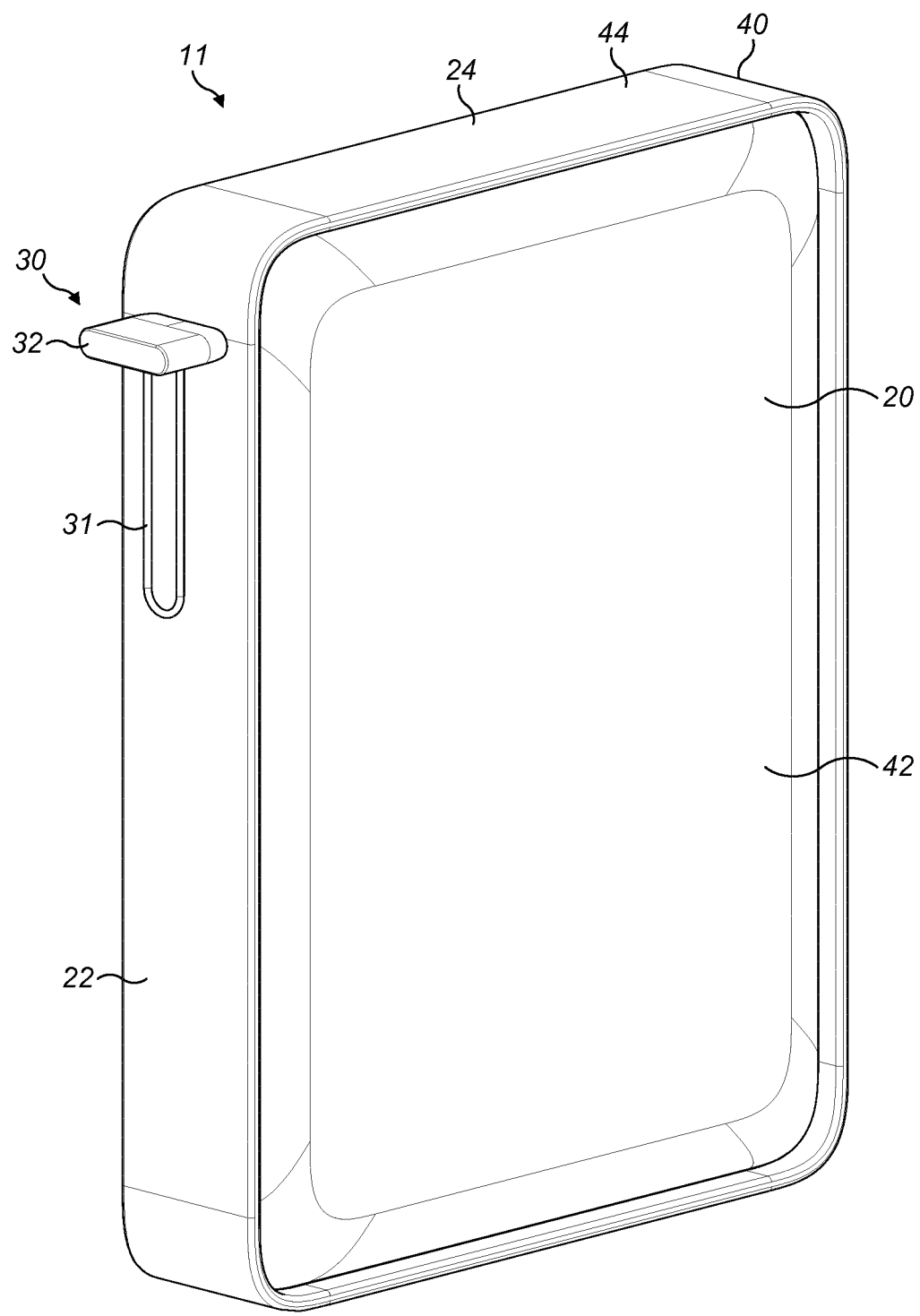
FIG. 2 is a perspective view of a beverage dispensing container of the present invention.
Figure 3:
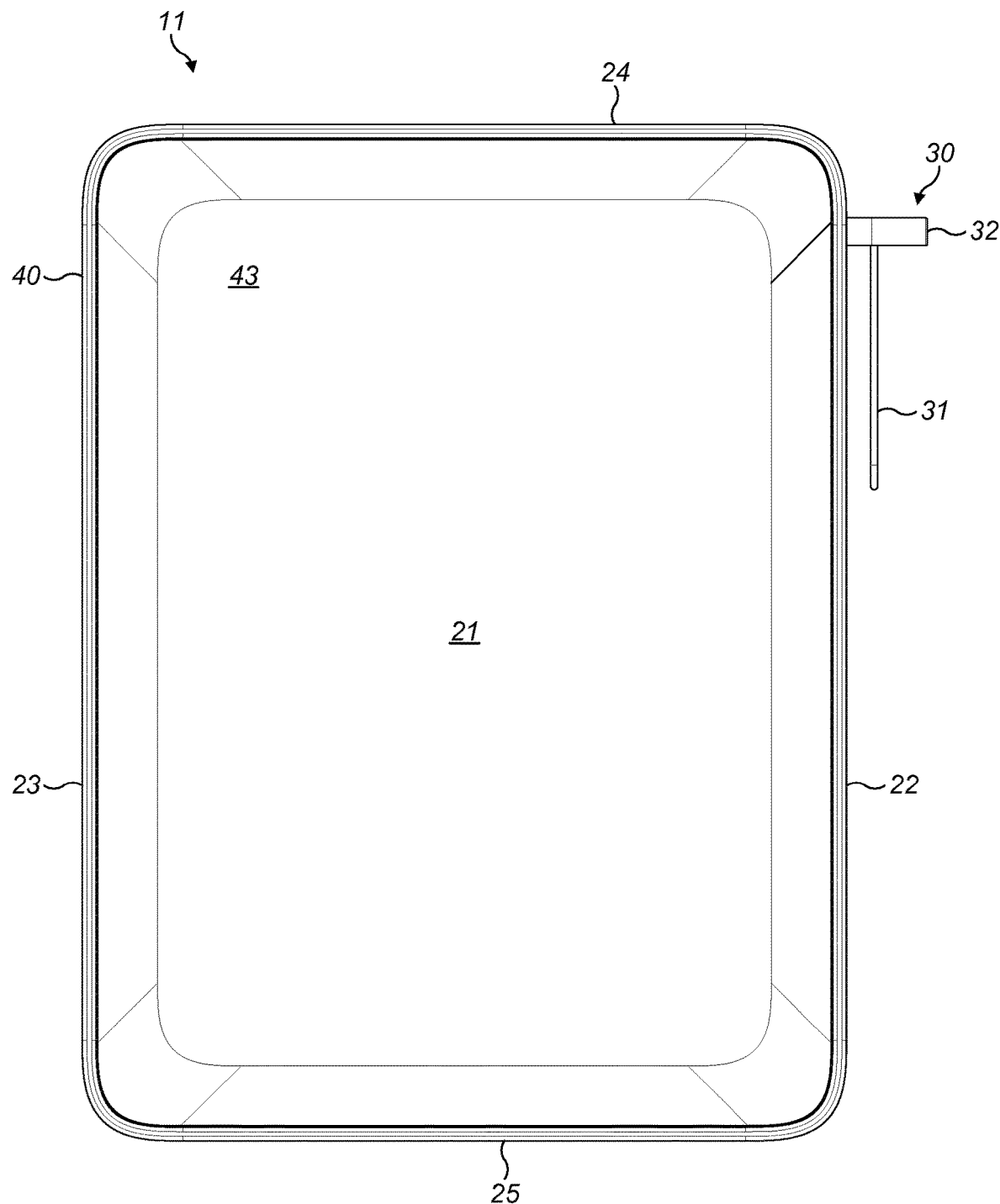
FIG. 3 is a side elevation of the beverage dispensing container of FIG. 2.
Figure 4:
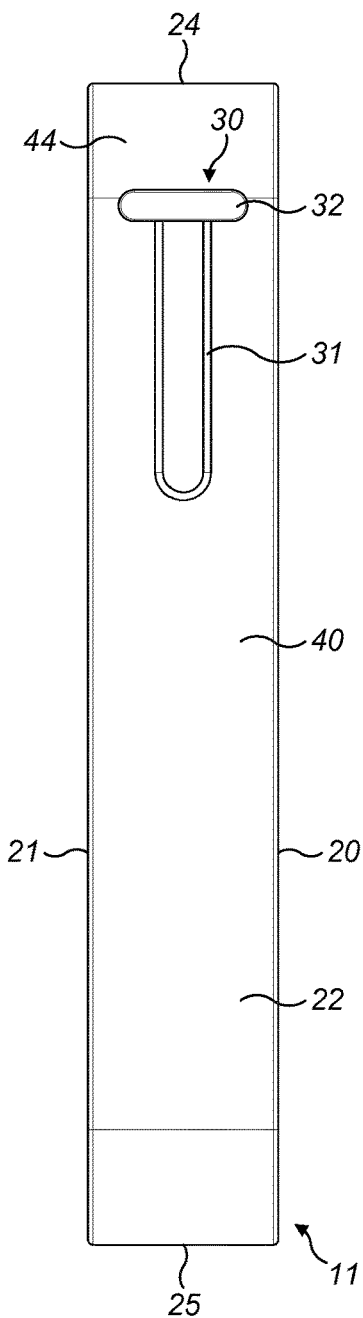
FIG. 4 is a front elevation of the beverage dispensing container of FIG. 2.
Figure 5:
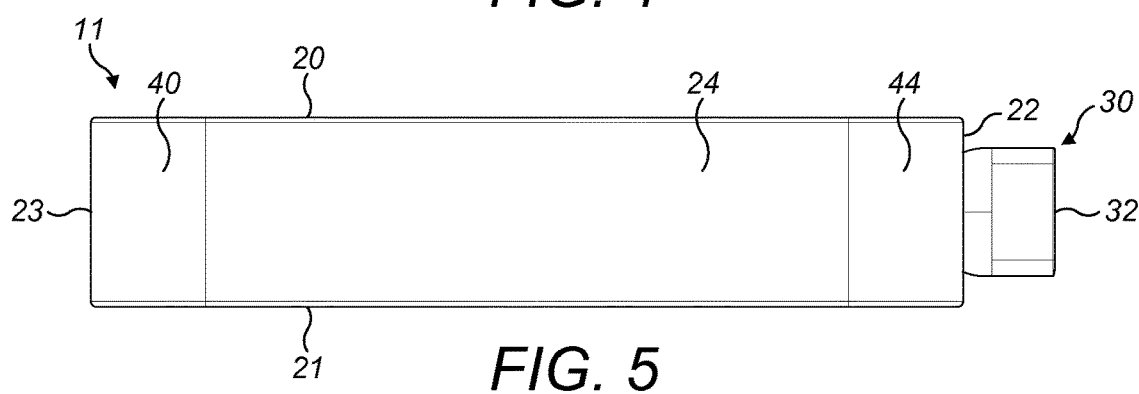
FIG. 5 is a plan elevation of the top of the beverage dispensing container of FIG. 2.

FIG. 1 illustrates an embodiment of the present invention in which a beverage dispensing system 10 comprises a plurality of beverage dispensing containers 11 each supported adjacent to at least one other by a base unit 12. Each container 11 is also operable to stand on a surface independently of the base unit 12.

As illustrated further in FIGS. 2 to 5, each container 11 is generally bibliomorphic (book shaped). An enclosure comprises first and second major side faces 20, 21, first and second minor side faces 22, 23 and first and second end faces 24, 25. In the present disclosure the term "minor" is used to indicate a small dimension (e.g. area or length) and the term "major" is used to indicate a larger dimension. For example, the surface area of each of the first and second major side faces 20, 21 is larger than the surface area of each of the first and second minor side faces 22, 23.

As illustrated in FIGS. 1 to 5, the faces 20, 21, 22, 23, 24, 25 are each substantially rectangular in shape. Each major edge of the first and second major side faces 20, 21 is coincident with a major edge of the first or second minor side face 22, 23. Each minor edge of the first and second major side faces 20, 21 is coincident with a major edge of the first and second end faces 24, 25. Each minor edge of the first and second minor side faces 20, 21 is coincident with a minor edge of the first and second end faces 24, 25. The container 11 therefore has a substantially rectangular cuboidal shape. In alternative embodiments the container 11 has another suitable shape, such as a cube or square cuboid.

The container 11 further comprises a beverage dispensing arrangement. The beverage dispensing arrangement comprises a dispensing valve 30 for controlling liquid beverage flow or selectively dispensing liquid beverage from a beverage reservoir (not shown in the Figures) located within the container 11. The beverage dispensing arrangement is controlled by a dispensing actuator 31.

Container Construction

As illustrated in FIGS. 1 to 9A, each container 11 comprises a rigid hoop or band 40 surrounding and defining an opening 41. The band opening 41 is closed laterally (i.e. on either side of the band 40) by first and second walls 42, 43 mounted with (i.e. in, on and/or to) the band 40, thereby forming a substantially sealed enclosure within. The enclosure forms and/or contains a reservoir suitable for storing beverage. The beverage dispensing arrangement (not shown in FIGS. 1 to 9B) is also provided in the enclosure to enable beverage to be dispensed through the dispensing valve 30 from the reservoir. The dispensing valve 30 is mounted to the band 40, but in alternative embodiments it may be mounted to the first or second wall 42, 43.

The first and second minor side faces 22, 23 and first and second end faces 24, 25 are formed by the band 40. The first and second major side faces 20, 21 are formed substantially from the outer edges of the band 40 and the first and second walls 42, 43.

The container 11 may be shaped and sized to fit through a domestic letterbox (mail slot). In Europe, the opening in such a letterbox is typically around 250 mm wide and around 30-40 mm high, so the dimensions of a cross-section of the container 11 may be less than, say, 250 mm×40 mm. In a particular embodiment, the container 11 has the dimensions of about 200 mm×150 mm×36 mm. Preferably the width of the band 40 (i.e. the minor dimension of the first and second minor sides faces 22, 23 and first and second end faces 24, 25, or minor dimension of the internal and external surfaces 44, 45) is less than 40 mm, more preferably less than 35 mm and more preferably less than 30 mm. Such dimensions equally permit delivery of the container 11 to a curbside mailbox such as is common in North America.

The band 40 comprises a strip having major internal and external surfaces 44, 45 formed substantially as a loop. The external surface 44 faces substantially away from the band 40 and the internal surface 45 faces towards itself or inwards from the band 40. The band 40 extends all the way around the periphery of the first and second walls 42, 43. The band 40 may also be described as a loop, ring, brace or hoop comprising a substantially continuous outer surface. The meaning of the term "substantially continuous" includes the embodiments wherein a split (described hereinbelow) is provided in the band.

As illustrated, the band 40 may be substantially rectangular with curved corners. In other embodiments the band 40 is shaped substantially as another type of polygon or quadrilateral, such as a triangle or square. Alternatively the band 40 may be in the shape of a semi-circle or the like. The band 40 generally comprises at least one substantially flat outer surface to enable the container 11 to rest in a stable manner on a flat surface.

The band 40 provides the primary structural support for the container 11. The band 40 prevents inwards collapse of the container 11 and thereby maintains the shape of the container 11 when a force is applied to the first and second minor side faces 22, 23 and first and second end faces 24, 25. The band 40 is stiffer than the first and second side walls 42, 43.

The material selected to form the band 40 maintains the integrity of the reservoir when the container 11 is dropped through a letterbox onto the floor inside a building or onto the bottom of a mailbox. Again, in Europe, current standards permit the letterbox to be anywhere between 0.7 m and 1.7 m above the ground and the structure and integrity of the band 40 must be sufficient to accommodate this drop. Of course, where a mailbox is provided instead of an opening in a door of a dwelling, for example, the drop to the bottom of the mailbox from its opening is relatively short.

The structural support provided by the band 40 and cuboidal shape of the container 11 enable a plurality of containers 11 to be stacked adjacent to and/or on top of one another. Stacking efficiency is thereby achieved by the saving of space during stacking.

The band 40 may be manufactured, for example, from a single cast of metal or from moulded plastic. Alternatively the band 40 is manufactured by bending an elongate plate or strip back on itself at four corners and joining the two ends of the plate together, for example by using a welding technique. The band 40 may alternatively be formed from a paper-based material, such as cardboard. A number of different arrangements may be employed to mount the first and second walls 42, 43 with the band 40, as illustrated in FIGS. 6A to 9B. In these Figures the beverage dispensing arrangement, including the dispensing valve 30 and dispensing actuator 31, is not shown for the sake of clarity.

Figure 6A:
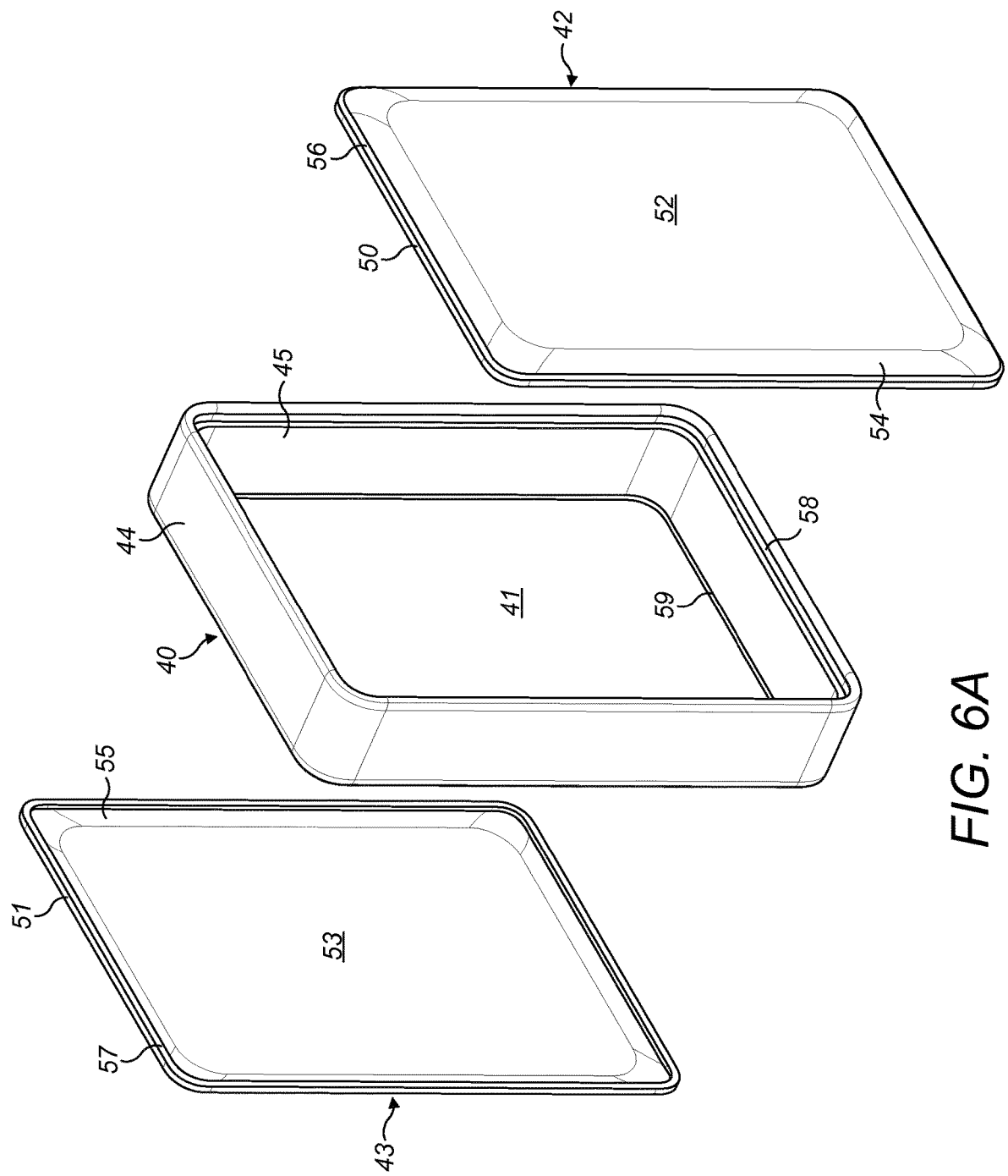
FIG. 6A is a perspective and exploded view of a first embodiment of the beverage dispensing container.
Figure 6B:
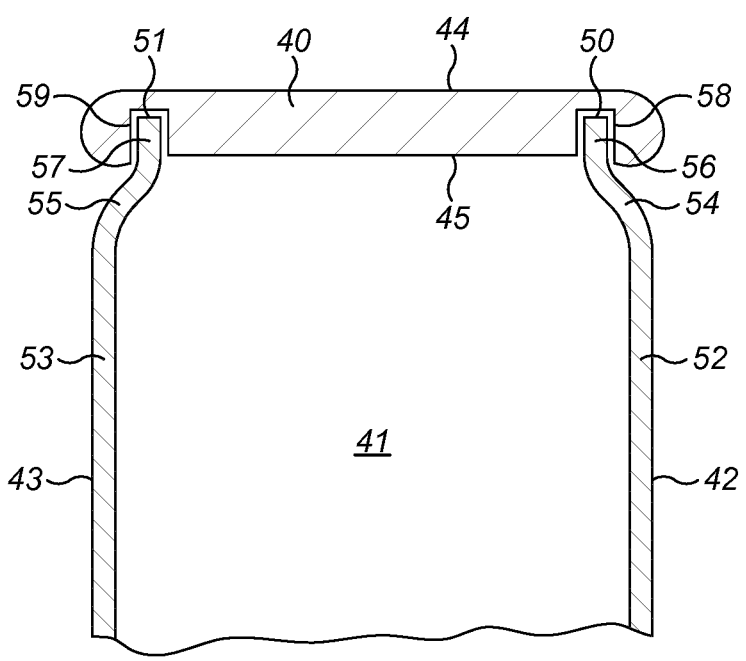
FIG. 6B is a cross-sectional side view through a portion of the embodiment of FIG. 6A.

In a first embodiment, as illustrated in FIGS. 6A and 6B, the first wall 42 is mounted about its periphery 50 to the band 40 and the second wall 43 is mounted about its periphery 51 to the band 40. The first and second walls 42, 43 each comprise substantially flat plates 52, 53 and curved portions 54, 55 that curve from the edges of the plates 52, 53 towards a direction orthogonal to the major plane of the plates 52, 53. Lips 56, 57 extend from the curved portions 54, 55 to the wall peripheries 50, 51 parallel to the major plane of the plates 52, 53. When assembled, each periphery 50, 51 is located in one of two contiguous slots 58, 59 extending around the internal surface 45 of the band 40. The slots 58, 59 are located adjacent to the sides of the internal surface 45 with a space therebetween to provide a volume for the enclosure.

The substantially flat plates 52, 53 are each preferably relatively rigid but also partially deformable. In construction, each plate 52, 53 is located in a part of its respective slot 58, 59 and then manipulated or deformed to allow the remainder of the plate to be snapped into place underneath the lips 56, 57 within the remaining parts of the slots 58, 59. Because of the deformability of the plates 52, 53, once the container is empty, a consumer may relatively easily dismantle the container 11 by removing the plates from the respective slots 58, 59 of the band. This allows for recycling of the plates if formed of a suitable material (see below), and/or recycling of the band 40, either together with or separately from the plates first and second walls 42, 43.

Figure 7A:
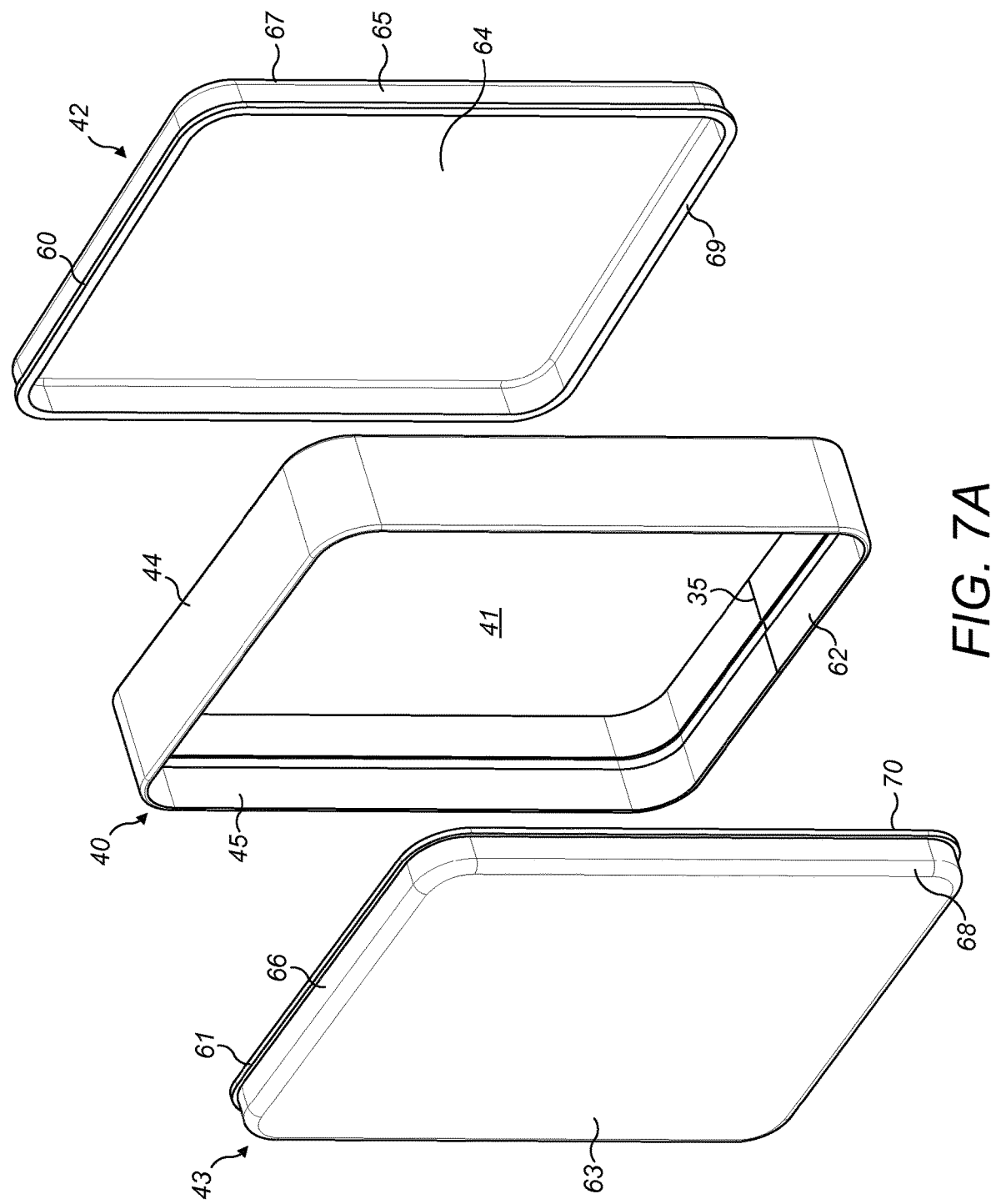
FIG. 7A is a perspective and exploded view of a second embodiment of the beverage dispensing container.
Figure 7B:
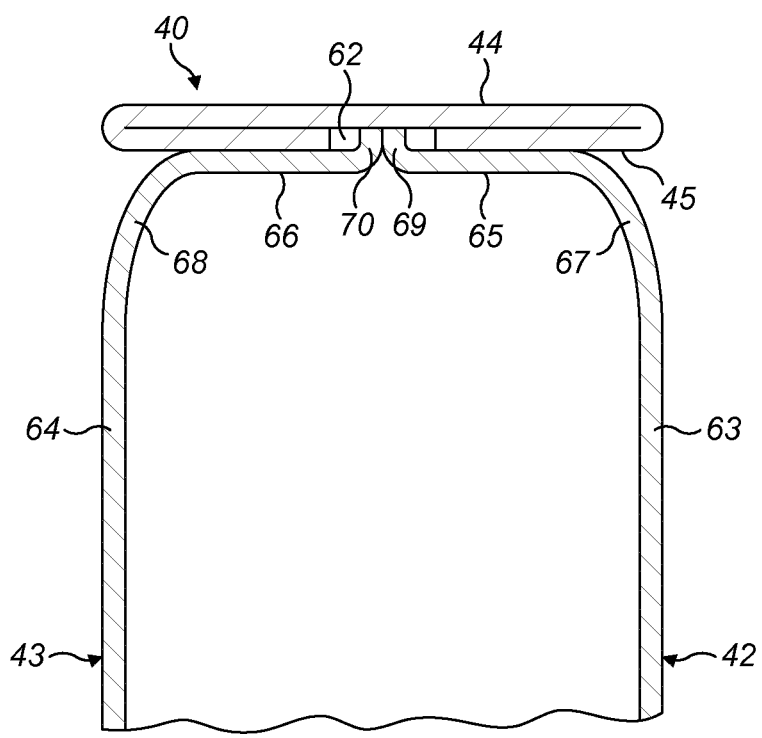
FIG. 7B is a cross-sectional side view through a portion of the embodiment of FIG. 7A.

In a second embodiment, as illustrated in FIGS. 7A and 7B, the first and second walls 42, 43 are both mounted adjacent to each other about their peripheries 60, 61 in a single slot 62 extending around the internal surface 45 of the band 40. FIG. 6B shows the slot 62 being formed by the outer edges of the band 40 being bent inwards towards one another, although in other embodiments the slot 62 is formed by a groove cut into the band 40. The first and second walls 42, 43 each comprise substantially flat planar parts 63, 64 and flanges 65, 66 connected by inward curved portions 67, 68. Lips 69, 70 extend from the flanges 65, 66 to the wall peripheries 60, 61 parallel to the major plane of the flat planar parts 63, 64. When assembled, the flat planar parts 65, 66 are positioned adjacent to the internal surface 45 of the band 40.

Figure 8B:
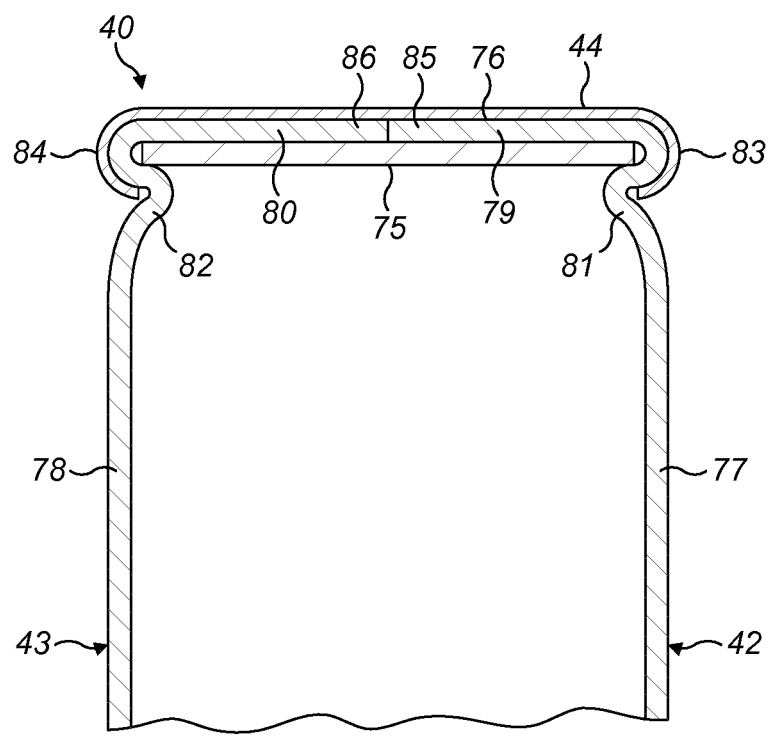
FIG. 8B is a cross-sectional side view through a portion of the embodiment of FIG. 8A.

In a third embodiment, as illustrated in FIGS. 8A and 8B, the first and second walls 42, 43 each have a flat planar portion 77, 78 and a flange 78, 79 extending inwardly from the respective flat planar portion. The flat planar portions 77, 78 are joined to the respective flanges 78, 79 through curved portions 81, 82. In one embodiment (as shown in FIG. 8B), the flat planar portions 77, 78 and flanges 78, 79 are formed as single, contiguous members. In other embodiments, the flat planar portions 77, 78 may be formed separately from the flanges 78, 79 and in that case the flat planar portions 77, 78 may be permanently bonded to the respective flanges 78, 79, or selectively separable from/ connectable to one another.

The flanges preferably extend about half the width of the band 40 inwardly of the respective flat planar portions 77, 78. Each of the first and second walls 42, 43 is mounted in use onto an intermediate support frame 75. In particular, the flanges 78, 79 are slid or pressed over opposing edges of the intermediate support frame 75 so that the inwardly extending edges of each flange abut one another approximately half way across the width of support frame 75. The resultant assembly is then pressed into the opening defined by the band 40 and seats within a channel 76 formed on the inside circumference of the band 40. The channel 76 is defined by lips extending around the edges of the band 40 so that, once the inner assembly defined by the walls 42 and 43 and the intermediate support frame 75 is pressed into place within the channel 76, the lips on the band 40 resist lateral movement of the walls 42, 43 and the intermediate support frame 75 that they capture. The band 40 extends around the flanges 79, 80 so that the base of the channel 76 forms an interference fit with the outer surface of the flanges. When assembled, the curved portions 81, 82 that form the boundary between the flat planar portions 77, 78 and the flanges 78, 79 are complementary to inwardly curving edges 83, 84 of the channel 76, so that the first and second walls 42, 43 are interlocked with the band 40.

The arrangement of FIGS. 8A and 8B provides for additional structural integrity to the container 11, although potentially at a trade off with additional material costs and weight. Moreover, because of the particular four-piece construction of this embodiment, there is a reduced requirement for flexibility of the flat planar portions 77, 78 relative to previous embodiments since the edges of the walls 42, 43 do not need to be snapped under protruding lips on the band 40. This in turn increases the range of suitable materials from which the walls 42, 43 may be manufactured.

Figure 9A:
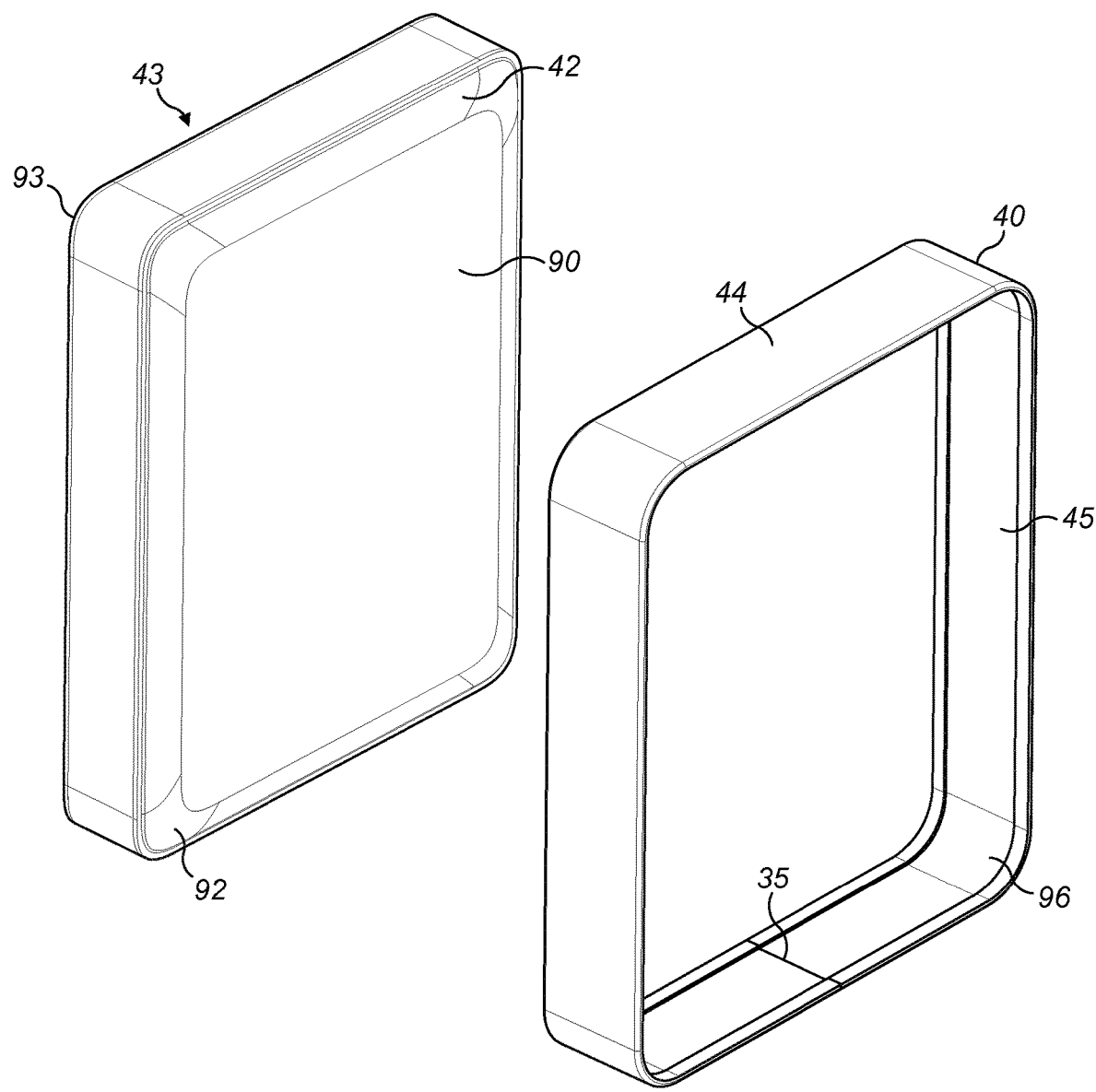
FIG. 9A is a perspective and exploded view of a fourth embodiment of the beverage dispensing container.
Figure 9B:
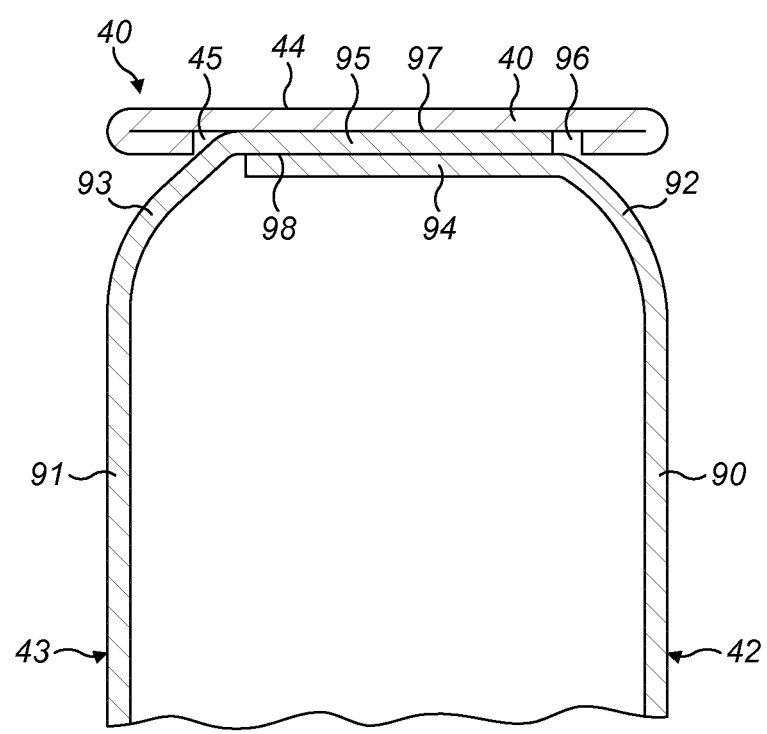
FIG. 9B is a cross-sectional side view through a portion of the embodiment of FIG. 9A.

In a fourth embodiment, as illustrated in FIGS. 9A and 9B, the first and second walls 42, 43 comprise substantially flat plates 90, 91 connected by curved portions 92, 93 to bands 94, 95 extending in the direction of the opposing wall 42, 43.

When assembled, the second wall 43 is mounted in a single slot 96 on the internal surface 45 of the band 40 about the periphery 97 of the second wall 44. The periphery 98 of the first wall 42 is mounted adjacent to and within the second wall band 95 in an interference-type fit.

The first and second walls 42, 43 may be releasably engaged with the band 40. The first and second walls 42, 43 can therefore be separated from the band 40 by the user when the container 11 contains no further beverage. Therefore, recyclability of the container 11 is improved. Preferably the first and second walls 42, 43 can be snap-fitted into the slots 58, 59, 62, 76, 96 in the band 40. Alternatively, the first and second walls 42, 43 are permanently attached to the band 40, for example by interference fits and/or adhesive. Preferably recesses or indentations (not shown) are provided in the first and second walls 42, 43 and/or the band 40 to improve the grip available to a user.

As illustrated in FIGS. 7A and 9A, one or more splits 35 may be provided across the band 40 (i.e. in a direction perpendicular to the circumference of the band 40). This permits the width of the band 40 to be increased/expanded, in order to allow the first and second walls 42, 43 more readily to be separated from the band 40. This improves the ease of disassembly of the container 11. Alternatively, the band 40 may be completely continuous with no splits 35.

In the embodiments of FIGS. 6A, 6B, 7A, 7B, 8A and 8B, as noted, the substantially flat plates of the first and second walls are preferably formed of a relatively rigid but deformable and lightweight material so as to provide, on the one hand, a degree of rigidity and impact protection to the side walls 42, 43 of the container 11, but equally to allow manipulation (by hand or machine) so as to facilitate construction and dismantling of the container as described below. It is further desirable that the first and second walls 42, 43 are formed of a material or materials that is/are insoluble in water, and preferably liquid absorbent as well. The purpose of this is to avoid disintegration of the first and second walls 42, 43 should the beverage inside the container 11 leak or be spilled upon the walls (internally or externally of them), or upon contact of a liquid, such as rain, with the outside of the container 11.

Suitable materials to form the plates 52, 53 might be a thick cardboard, a thin metallic sheet, or a plastics material. A cardboard material is particularly preferred for reasons of cost, weight and ease of recycling, and because cardboard can be easily and inexpensively embossed and/or printed upon to allow identification and branding of the contents of the container.

Although, again as noted, the flat planar portions 77, 78 of the first and second side walls 42, 43 in the embodiment of FIGS. 8A and 8B need not necessarily be formed of a flexible material, again preferably a cardboard material may be employed even so, for reasons of cost, weight and so forth. Although the foregoing describes a number of alternative arrangements for the construction and configuration of the container 11, it is to be that these are merely exemplary and that other forms are contemplated. In particular, although there are advantages to the modular structure shown in FIGS. 6-9, in terms of sustainability of materials, ease of recycling, cost, weight and so forth, it is not essential that the container 11 be formed of multiple separate or separable parts. A unitary (one piece) structure could instead be employed. Of course, whatever the construction, it must be possible for the beverage to be included inside, and it is highly desirable that the beverage container (or, at least, a reservoir or other fluid receptacle inside the container itself) should be tamper proof and non-refillable by consumers. This may for example require the container 11 to have a flap or hinged panel to allow access to fill the container or the reservoir/receptacle inside.

Beverage Dispensing Arrangement

Figure 10:
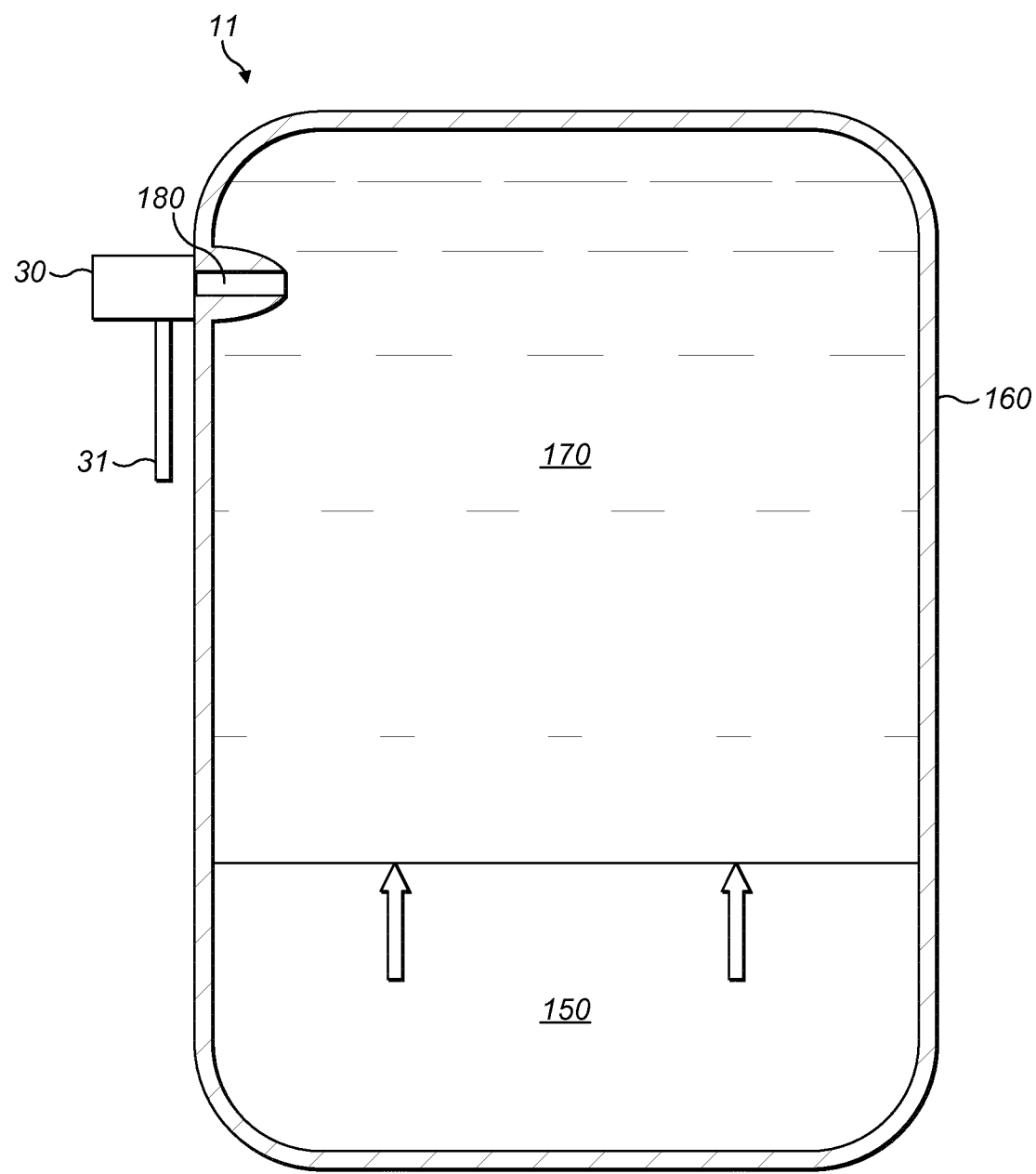
FIG. 10 is a schematic view of a beverage dispensing arrangement of the present invention.

Various different embodiments of the beverage dispensing arrangement may be employed. One highly schematic example is shown in FIG. 10. It is to be understood that FIG. 10 is intended simply to illustrate the principles by which fluid is retained in, and dispensed from, the container 11. Features common to FIGS. 1-5 and 10 are labelled with like reference numerals.

In a preferred embodiment, the beverage dispensing arrangement of FIG. 10 comprises pressurising means labelled generally as 150. The pressurising means 150 applies pressure to a compressible beverage reservoir 160 containing a beverage 170. Compressing the reservoir 160 causes the beverage 170 in turn to flow along a dispensing conduit 180 formed between the body of the reservoir 160 and the dispensing valve 30, and to press against the dispensing valve 30 at the end of the dispensing conduit 180. Therefore, when the dispensing valve 30 is opened, beverage 170 is driven from the reservoir 160, along the dispensing conduit 180, and out of the dispensing valve 30. Preferably there are no air gaps within the reservoir 160, such that as beverage 170 is ejected the internal volume of the reservoir 160 is reduced.

The reservoir 160 comprises, in one embodiment, a bag formed of a flexible impermeable membrane having an outlet forming the dispensing conduit 180. The dispensing conduit 180 is in turn sealed to the dispensing valve 30. The dispensing valve 30 opens onto the inside of the reservoir to draw beverage directly from the reservoir. The reservoir 160 is compressed in the direction of the dispensing conduit 180. In an embodiment the reservoir 160 comprises a bag having concertinas which, as the bag is compressed, fold inwards to reduce the size of the internal volume.

The reservoir 160 may also comprise a plurality of bags, each being compressed by the pressurising means. Each bag may be emptied sequentially or simultaneously by the pressuring means.

Instead of forcing fluid upwards and out of the dispensing valve 30 through the dispensing conduit 180, connection between the dispensing valve 30 and the beverage 170 may instead be achieved via a tube that extends from the inside of the dispensing valve to the bottom of the reservoir 160. Compression of the reservoir then results in fluid from the bottom of the reservoir 160 being forced up the tube to the dispensing valve 30, to eject beverage therefrom.

A flow regulator may also be provided between the reservoir 160 outlet, dispensing valve 30 and/or dispensing conduit 180 to ensure that as the reservoir 160 is compressed the flow of beverage 170 from the dispensing valve 30 remains substantially constant. The flow regulator may be formed integrally with the dispensing valve 30.

The pressurising means 150 may comprise a spring, piston, elastic band or the like which resiliently biases against the reservoir 160 (preferably in the form of a bag once more) so as to apply a compressive force thereto. For example, a spring or springs may be located between the reservoir 160 and the container 11; a piston, for example formed of a flat plate, may be located between the at least one spring and the reservoir 160; or at least one elastic band may be wrapped around the reservoir 160 or located within and attached to the reservoir 160, the tensile force of which elastic band is used to compress the reservoir 160.

The at least one elastic band could, for example, be under maximum tension when the reservoir 160 is full of beverage and may become progressively less taut as beverage is emptied from the reservoir 160. Preferably the elastic band is maintained within its elastic range between when the reservoir 160 is full and when it is empty, such that it always provides a compressive force to the reservoir 160. The elastic band may fully encircle the reservoir to compress the reservoir in on itself. Alternatively, the elastic band might be arranged to compress the reservoir against one or more of the internal walls of the container 11. For example, the elastic band could be attached at one or more points to the container 11 and encircle the reservoir 160, thereby being arranged to compress the reservoir 160 towards its one or more points of attachment. In still a further alternative, the elastic band could be attached at one or more points to the container 11 and encircle a piston, for example formed of a flat plate. The reservoir 160 in that case may be located between the piston and the container 11. Consequentially, the elastic band draws the piston towards its one or more points of attachments and compresses the reservoir 160 therebetween. In addition and/or alternatively, a plurality of elastic bands may encircle the reservoir 160 such that as beverage 170 is released a plurality of concertinas are formed in the reservoir 160.

The reservoir 150 may form the pressurising means 150 by comprising an elasticated bag that is arranged to collapse inwards. Such an elasticated bag may be combined with other pressurising means 150, such as elastic bands wrapped around it.

The pressurising means 150 may further comprise one or more rollers for compressing the reservoir 150. In one embodiment, one or more pairs of adjacent rollers are provided and the reservoir is drawn through the pair of rollers, thereby pressurising the beverage 170 therein. Alternatively, the reservoir 160 is wrapped around a roller. Rolling means are provided to cause the roller to rotate such that the reservoir 160 wraps around it. For example, the roller comprises a bar attached along a lower edge of a substantially rectangular reservoir 160. The rolling means comprises springs and/or elastic bands attached to the bar and adjacent to the top edge of the reservoir 160. A torsion spring is particularly suitable to store mechanical energy so that, when the dispensing valve is opened, the reservoir 150 is wound around the roller and fluid is thereby ejected from the container.

Other configurations of pressurising means 150 are envisaged. For example, the pressurising means 150 could be provided by a gas source, such as compressed gas releasable from a pressure vessel. The pressure vessel may be provided between the reservoir 160 (the bag) and the container 11, which in that case would be pressure sealed. The release of compressed gas from the pressure vessel results in an overpressure inside the container 11 which applies an inward force upon the reservoir 160, thereby causing the beverage 170 contained therein to be squeezed out of the reservoir 160 towards the dispensing valve 30, so that when the valve is actuated, beverage 170 is dispensed from it. Alternatively, a sealed inflatable pouch might be provided between the container 11 and the reservoir 160 containing the beverage 170. The inflatable pouch may for example be formed of a flexible membrane so that it expands as compressed gas is directed into it. The inflatable pouch may be located between the reservoir 160 containing the beverage 170, and the container 11, such that as it expands it applies a force to and compresses the reservoir 160. In a further alternative, the inflatable pouch could be located within the reservoir 160 itself, such that, as the inflatable pouch expands, the volume inside the reservoir 160 decreases which in turn increases the pressure on the beverage inside the reservoir. When the dispensing valve 30 is opened, the beverage 170 then flows out of that valve.

In a further alternative, the gas source comprises a reservoir of vinegar and a supply of bicarbonate of soda. The bicarbonate of soda is dispensed into the vinegar as the dispensing valve 30 is actuated, thereby creating carbon dioxide. The carbon dioxide compresses the reservoir 160 in any of the arrangements as previously described in relation to the pressure vessel being the gas source. Furthermore, such an arrangement may be used to cool the beverage contained in the reservoir 160, since such a reaction is endothermic.

In yet a further alternative, the pressurising means 150 might be constituted by a pressure vessel arranged to release compressed gas directly into the reservoir 160. In that case, it is desirable that the gas be substantially immiscible with the beverage and may be, for example, carbon dioxide and/or nitrogen. As gas is released into the reservoir 160, it displaces the beverage 170 such that the beverage 170 applies a force upon the dispensing valve 30. In this instance the reservoir 160 need not be formed of a flexible membrane and instead may be any vessel capable of withstanding the force developed therein by the beverage 170 and/or gas.

A valve may also be attached to the pressure vessel in that case, to selectively release the compressed gas; a valve actuator may be provided to control the pressure vessel valve. The valve actuator may be connected to the dispensing actuator 31, such that compressed gas is released upon opening of the dispensing valve 30. Alternatively, the valve actuator might comprise a separate control switch. In one embodiment, this separate control switch may be positioned on the outside of the container 11. Then, a user would be required to operate the control switch to release the compressed gas and thus increase the pressure in the reservoir 160. This in turn increase the force applied by the beverage 170 to the dispensing valve 30. In a further alternative, the separate control switch could be internal of the container 11 and actuatable remotely by receipt of signals sent from a cooperating tray, tablet, pc or the like.

The dispensing valve 30 may be arranged to break a seal or the like on the pressure vessel when it is first actuated.

In still another alternative, the pressure vessel valve might be operable to automatically dispense gas from the pressure vessel when the pressure at the pressure vessel outlet drops below a predetermined value.

In a further embodiment the beverage dispensing arrangement could employ a pump-action arrangement. The actuation of the dispensing actuator 31 pumps fluid from the reservoir 160 and out of the dispensing valve 30. Such an arrangement is not preferred, however, since it does not allow for a controlled, measured and/or continuous flow of the beverage 170 from the reservoir 160 and out of the dispensing valve 30.

In yet a further embodiment the beverage dispensing arrangement may include an electro-mechanical structure including an electrically-driven pump that directs beverage 170 from the reservoir 160 and out of the dispensing valve 30 upon actuation of the dispensing actuator 31. The pump may draw power from a battery mounted within or on the container 11. Alternatively the pump may draw power from an external supply, such as mains electricity.

In the aforementioned embodiments of the beverage dispensing arrangement, the dispensing actuator 31 is operable to dispense beverage from an opening in the dispensing valve 30. The pressurising means 150 pressurises the beverage against the dispensing valve 30 when closed. Once the dispensing valve 30 is opened, the overpressure causes beverage to be ejected from the opening. The dispensing valve 30 may be a one-way or check valve, which prevents the ingress of air into the reservoir 160 and thereby prevents the beverage 170 contained therein from deteriorating. In particular, the dispensing valve 30 comprises two opposing duckbill valves arranged in a conduit. One duckbill valve prevents fluid from entering the reservoir, such that air is kept out of the reservoir 160. The other duckbill valve prevents beverage from exiting the reservoir until it is actuated, for example by compression resulting from the actuation of the dispensing valve 30.

In FIGS. 1 to 5 the dispensing valve 30 comprises a valve body 32 and the dispensing actuator 31 comprises an elongate actuating lever projecting from, and moveably attached to, the valve body 32. The dispensing actuator 31 may be in any other suitable form, such as a button, a proximity sensor or an electric switch located on the outside of the container 11. The dispensing actuator 31 may control the opening of the dispensing valve 30 and/or, when applicable, a pump of the beverage dispensing arrangement.

The dispensing valve 30 is mounted on and projects from the first minor side face 22 and is generally offset from the centre line parallel to the minor edges of the first minor side face 22. When the second end face 25 stands on the base unit 12 or other surface, the dispensing valve 30 is located in the upper half of the first minor side face 22. In other embodiments the dispensing valve 20 is located in the upper half of any one of the side faces 20, 21, 22, 23. Alternatively, the dispensing valve 20 may be located on one of the end faces 24, 25. Although it is not essential that the dispensing valve 30 be positioned in the upper half of the end or side faces, by locating the dispensing valve in that upper half, sufficient height is provided to allow a glass other drinks receptacle to be placed underneath the dispensing valve so that beverage can be dispensed directly into that drinks receptacle whilst it sits on a surface next to the container 11.

The beverage dispensing arrangement may be operable to dispense beverage as a continuous flow, in a single measured dose or in two or more measured doses. Alternatively, the beverage dispensing means may be arranged to permit switching between a first, continuous pour mode and a separate, single (or multiple) measured dose mode. For example, when the dispensing actuator 31 is actuated (pressed) once, for a limited period, a single dose of beverage might be dispensed, when it is pressed twice in quick succession, a double dose of beverage might be dispensed, and when it is pressed continuously, beverage may in turn dispense continuously until the dispensing actuator is released again.

Figure 11A:
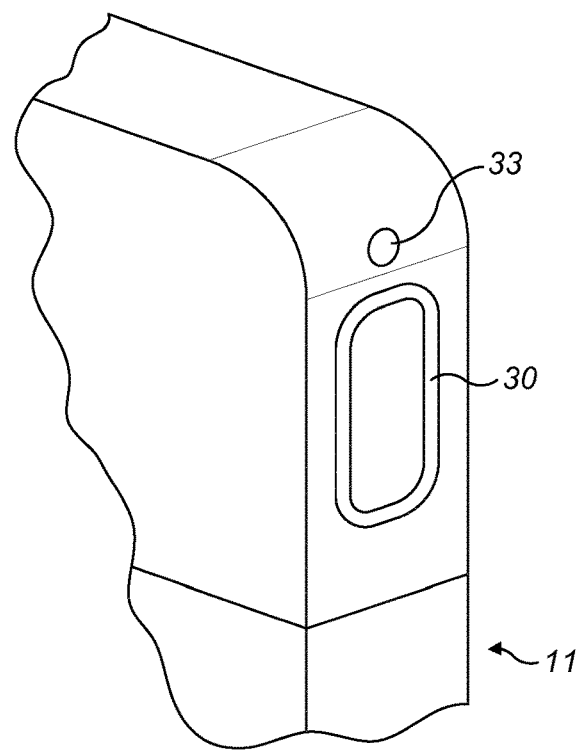
FIG. 11A is a perspective view of a portion of a container of the present invention comprising a valve in a locked position.
Figure 11B:
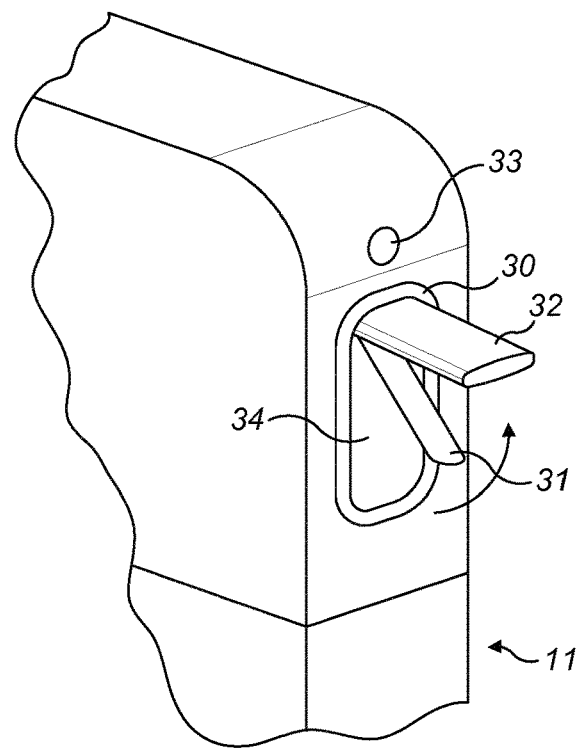
FIG. 11B is a perspective view of a portion of a the container of FIG. 11A wherein the valve is in an unlocked position.

As illustrated in FIGS. 11A and 11B, the container 11 may further comprise a recess 34 for receiving the valve body 32 in a locked position. In the locked position, as illustrated in FIG. 11A, the valve body 32 does not substantially protrude from any of the faces 20, 21, 22, 23, 24, 25 of the container 11 and the dispensing valve 30 cannot dispense beverage. The valve body 32 is biased into the unlocked position, illustrated in FIG. 11B, by resilient bias means, for example a spring. To unlock the valve body 32, the valve body 32 is pushed inwards such that it is released and the resilient bias means moves it into the unlocked position. In the locked position the dispensing valve 30 may be operated to dispense beverage. As illustrated, in the embodiment in which the valve actuator 31 is a lever, the valve actuator is moveable between the unlocked and locked position with the valve body 32.

As illustrated in FIGS. 11A and 11B, an LED light 33 may also be provided to indicate when beverage is being dispensed from the container 11.

In yet a further embodiment of the beverage dispensing arrangement, the dispensing valve 30 is a one-way valve which enables beverage to be poured out of the reservoir when a user tilts the container 11 to a certain angle. The reservoir may be formed of a separate vessel, such as a bag formed of a flexible membrane, within the container 11. Alternatively, the reservoir is formed of the inside of the container 11, which is sealed, for example by a lining provided thereon. The one-way valve may be operable to dispense beverage freely, in a single measured dose or in at least two measured doses.

In yet a further embodiment, a plurality of reservoirs may be provided, each leading to a single dispensing valve 30.

Switching means are provided to enable a user to select the reservoir from which beverage is dispensed upon actuation of the dispensing valve 30. Alternatively, a plurality of separate beverage dispensing arrangements are provided in a single container 11, each comprising a separate dispensing valve 30. Thereby different beverages can be dispensed from a single container 11.

The Base Unit

In the beverage dispensing apparatus illustrated in FIG. 1 the base unit 12 comprises a generally planar support surface 14 on which one or more containers 11 may rest. However, the base unit 12 may be sized for supporting any number of containers 11 in any suitable arrangement.

In other embodiments the support surface 14 has a different shape that cooperates with the plurality of containers. For example, the support surface 14 may comprise a plurality of steps at different heights and the underside of each container 11 may be supported by a single step. As a result, the top side of each container 11 may be at a different height to one or more other containers 11. Alternatively, one or more containers 11 may be provided with different heights that correspond to the heights of the steps. Therefore, when the containers 11 are supported by the different steps of the support surface 14, the top side of each container 11 is at the same height.

In a further embodiment the base unit 12 does not support a container 11. Instead, the base unit 12 fits adjacent to or in proximity with one or more containers 11. In yet a further embodiment the apparatus comprises a plurality of base units 12, each base unit 12 being attached to a respective single container 11. In that case, a first base unit 12 may be configurable to connect to a second or further base units 12 so as to form a quasi-continuous arrangement. The connections may be mechanical only, or might instead be both mechanical and electrical, so that, in use, communication is possible between separate base units and/or between base units and a tablet computer for example.

As still a further extension to the concept of an individual base unit 12 dedicated to a respective container 11, it is possible to combine the arrangement so that the individual base unit 12 and container 11 form a single, integrated unit, that is, all of the functions of the base unit may be integrated into the container 11 so as to provide a single functional unit.

The beverage dispensing arrangement may also be integrated with the base unit 12. For example, a pump, or a gas canister and a canister outlet valve, may be located in the base. A control unit, receiving power from a power supply such as a battery or a mains power supply, controls the operation of the pump or outlet valve. A user input, derived either from control means located on the base unit 12 or a computing device (see below), is communicated to the control unit to actuate the pump or outlet valve.

Each container 11 may be docked with the base unit 12 by complementary docking ports on each container 11 and the base unit 12. The docking ports comprise passageways that enable fluid to flow between the base unit 12 and the container 11.

Alternatively or additionally, each container 11 may be stabilised on the base unit 12 by complementary magnets, clips or other stabilisation means.

One or more fluid passageways are provided between the pump or outlet valve and the base unit docking port(s). The containers 11 comprise one or more passageways to receive fluid the container docking port and are arranged to utilise the fluid to pressurise the beverage in a similar manner to that previously described in respect of FIG. 10. For example, the passageway may direct the fluid into the inflatable pouch, which applies pressure to the beverage reservoir 160. In such an embodiment the beverage dispensing arrangement in the container 11 is passive, thereby reducing the complexity and cost of the production of each container 11.

In an alternative embodiment the gas canister is rechargeable. A pump is provided in the base unit 12 to direct compressed air into the gas canister or, when insufficient compressed gas is in the gas canister, to direct air into the containers 11.

In an alternative embodiment a pumping system is provided in the base unit 12 and comprises at least one pump and a plurality of conduits. Beverage is directed from the container 11, through the docking ports, through the pump, returns to the container 11 from the base unit 12 and is then dispensed through the dispensing valve 30.

The beverage dispensing arrangement in the base unit 12 may also comprise a plurality of valves and passageways to selectively direct fluid between the pump or gas canister and a docking port that directs fluid to a selected container 11. The valves are controlled by the control unit. For example, upon receipt of a user input, the control means may direct fluid sequentially through different docking ports to dispense fluid from different containers 11 sequentially.

Furthermore, the control unit may be operable to control the dispensing valve 30 of each container, for example by connecting wirelessly to an electronic circuit controlling the dispensing valve 30 or via a contact established through the docking port(s). The control unit in the base may, therefore, prevent the dispensing of beverage until an input requesting the dispensing of beverage is received. The control unit in the base unit 12 may also direct power via such contacts to a control unit in each container 11.

The control unit may also be able to receive signals from each dispensing valve 30 via similar connection means. In a particular embodiment, the control unit does not dispense fluid from a container 11 until a signal has been received from the dispensing unit; the signal may indicate that a drinking vessel has been placed adjacent to the container 11 and is prepared to receive the beverage dispensed from the container 11.

One or more level sensing means for determining the level of beverage remaining in each container 11 may also be provided. Sensing means, such as load cells, may be provided on the support surface 14 to detect the weight of each container. Alternatively, the sensing means may be located in the container(s) 11 and communicated to the base 12. Suitable lever sensors include a dry contact sensor, a volumetric level sensor, a weight measuring sensor (e.g. a load cell), an ultrasonic level transmitter, a magnetostrictive or magnetic level transmitter, a capacitance transmitter, a float or a differential level transmitter.

The amount of beverage remaining in the container 11 may also be indicated by a display on the container 11 or the base unit 12. For example, the display may comprise an LED that emits a light once the amount of beverage falls below a predetermined level. Alternatively, an electronic display may indicate the amount of beverage in the container 11. In a further alternative, which may also be utilised in any embodiment of the container 11, a user may ascertain the amount of beverage remaining via a transparent window in the container 11.

The Beverage Dispensing System

Figure 12:
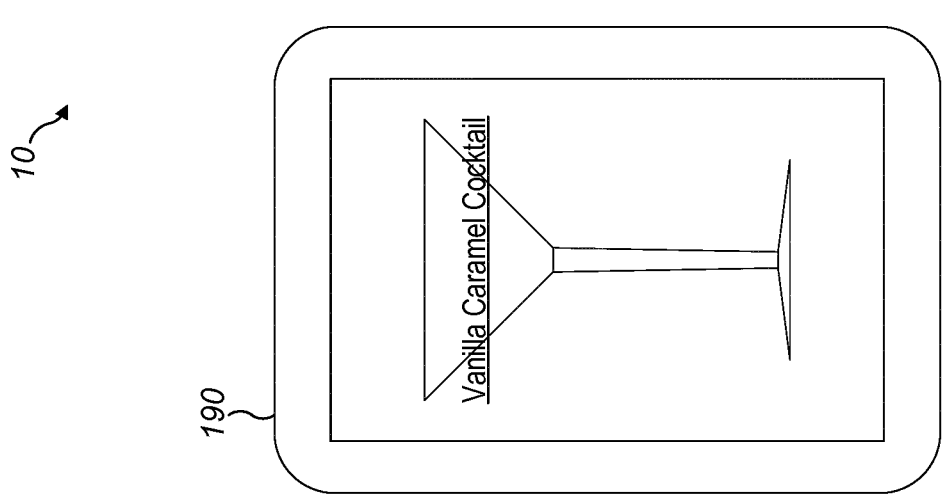
FIG. 12 is a view of the beverage dispensing system of FIG. 1 further comprising a computing device.
Figure 12:
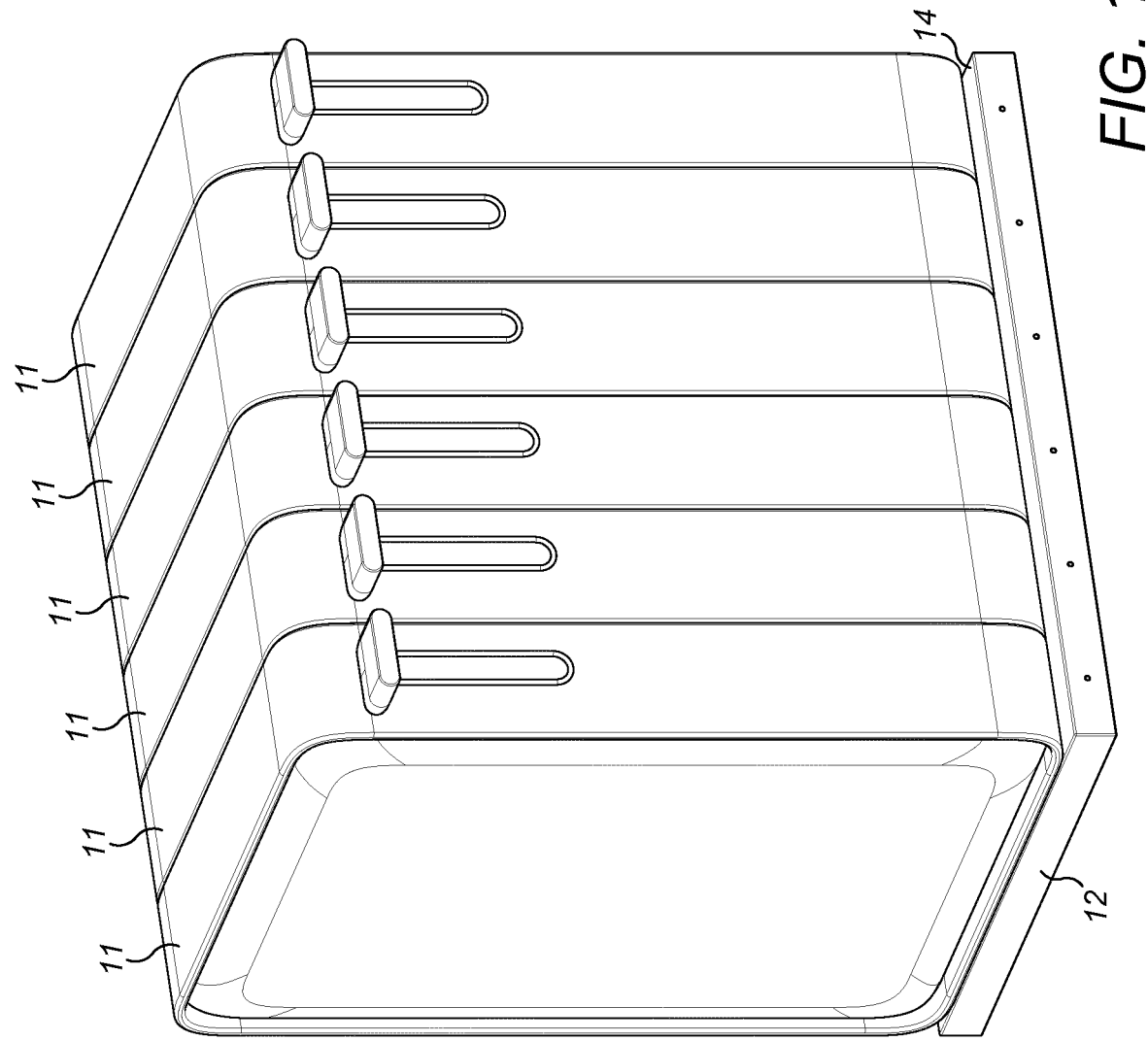

FIG. 12 shows schematically the beverage dispensing system 10 of FIG. 1, including the plurality of containers 11 and the base unit 12, along with a computing device 190 configured with suitable software/applications to allow control of the beverage dispensing system 10. Although in FIG.

12 the computing device is shown as a portable device separate from the base unit 12 and typically comprising a tablet computer or a smart phone, in other embodiments (not shown), the computing device 190 may instead comprise a dedicated hardware unit having software operable solely to control the base unit 12 and container 11 in the dispensation of beverage. For example, the computing device 190 might comprise or include one or more of a processor, a RAM, a ROM or other memory, a display device, one or more input/output devices and communication means between them. The memory preferably stores at least one of network browser software, website content, advertising content, application software, user profiles and beverage information.

Indeed the computing device 190 when not constituted by a user's tablet or smart phone but instead by a dedicated hardware configuration need not even be separate from the base unit and container; instead the computing device could be formed integrally with the base unit 12 with some form of user interface (such as a touch screen) to allow a user to input instructions to the beverage dispensing system 10.

In use, in the preferred embodiment illustrated in FIG. 12, the appropriate software application is run upon the computing device 190. This acts as a user interface, further details of which will be set out below, to allow a user interactively to dispense the beverage from the container 11. Particularly preferred user interface schemes provide for the computing device 190 to interact and control, separately, multiple containers 11 each positioned upon the base unit 12 and each containing different alcoholic and/or non alcoholic beverages. In this manner, the user may interact with the computing device 190 to allow the creation of cocktails and other mixtures of the various beverages available in the multiple containers 11 on the base unit 12.

Figure 13:
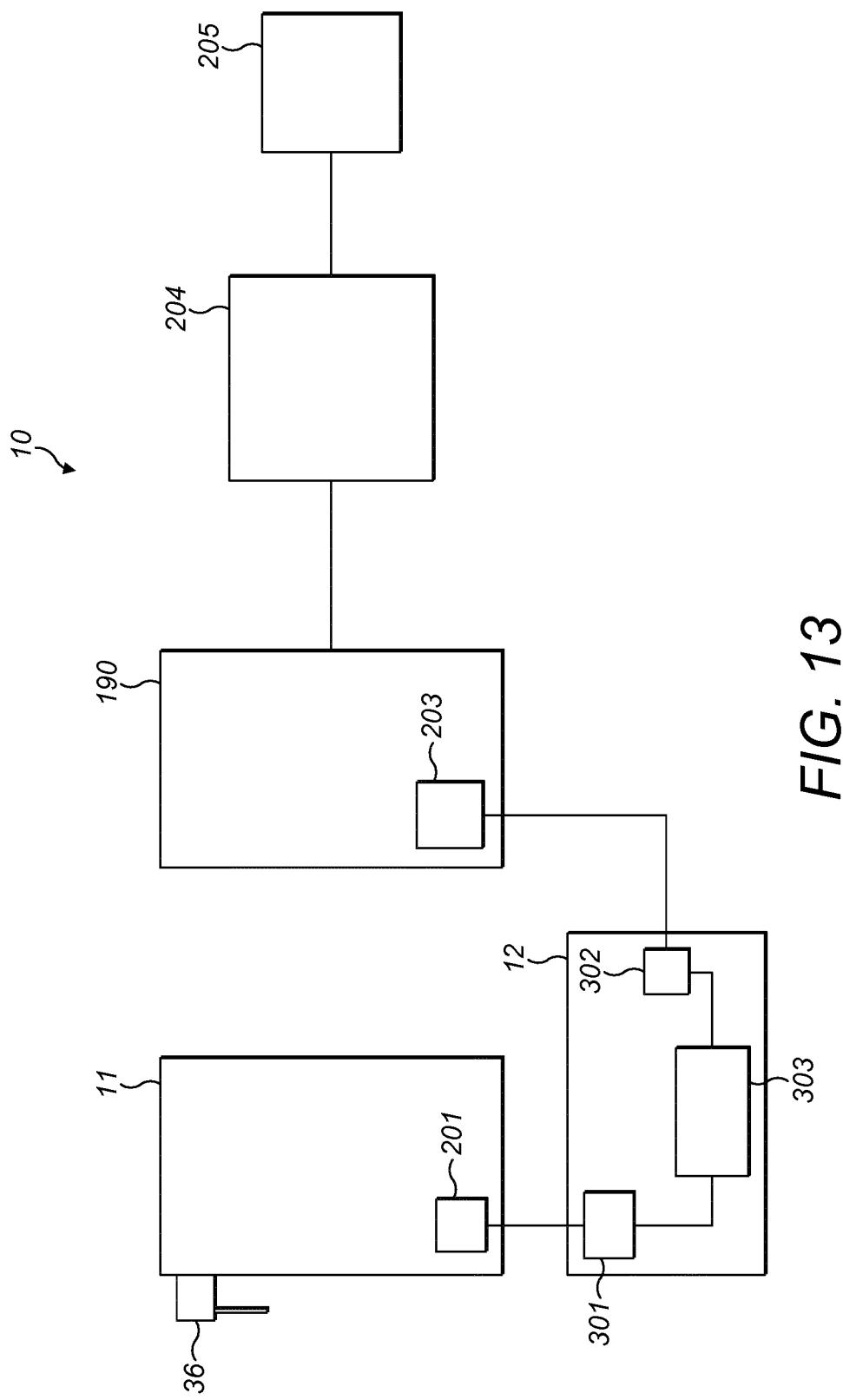
FIG. 13 is a schematic of a beverage dispensing system of the present invention.
Figure 14:
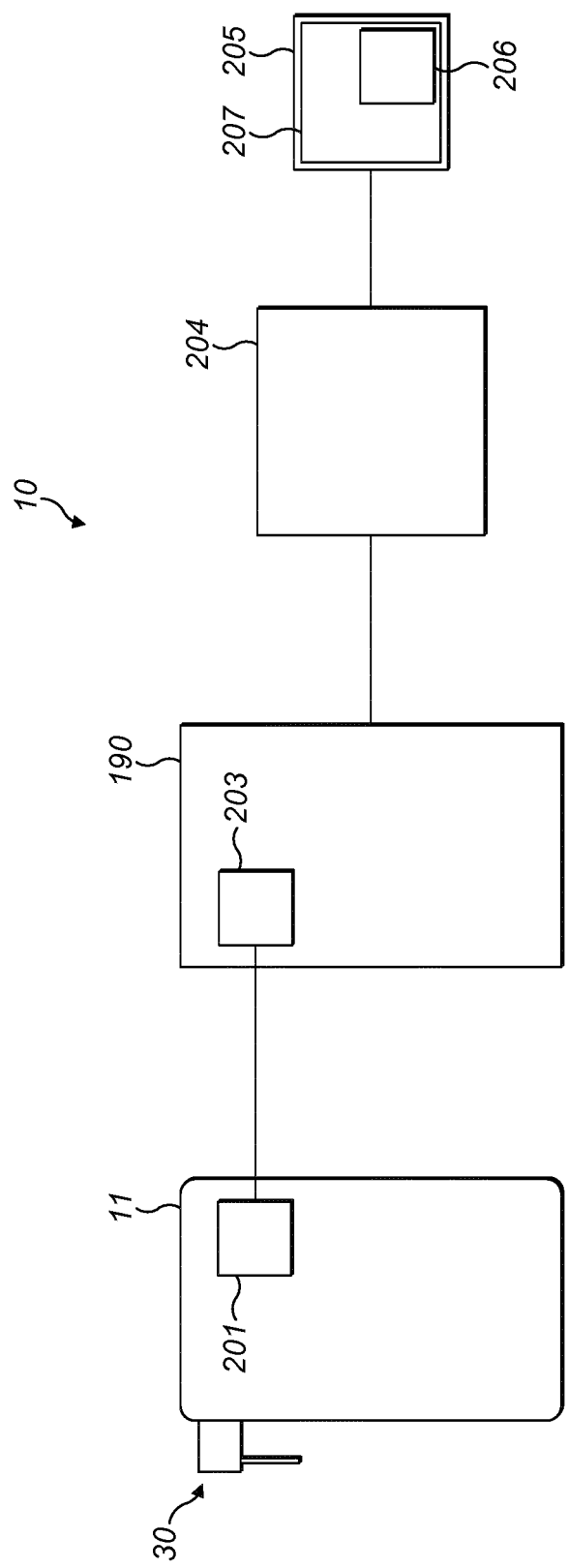
FIG. 14 is a schematic of a further embodiment of a beverage dispensing system of the present invention.

FIGS. 13 and 14 illustrate in schematic form the manner in which the container 11, and base unit 12, of the beverage dispensing system 10, and the portable computing device 190, communicate with one another so as to allow a user to control the dispensing of beverage from the container. The container 11 comprises a communication element 201 operable to store static or dynamic content, the content being capable of being read by or communicated to the computing means 190.

Instead of storing this information within a communication element 201 within an individual container 11, the information could equally be stored in a volatile or non volatile memory within the base unit 12. Moreover, the data could be stored upon the computing device 190, as a part of the application data of the software running on that, or even elsewhere such as in cloud storage or a server 205 connected to a network 204 (see below).

The static or dynamic content stored relates to at least one of: beverage information relating to the type of beverage stored in the reservoir, user profiles, advertising content, a link and/or the like.

The content relating to a user profile includes one or more of each of, or a combination of: user contact details, user preferred payment information, user preferences and user history. The user history may include at least one of: previous purchases of beverages and/or related products, previous use of the beverage dispensing system 200, previous consumption rate of beverage from containers 11, previous mixes of beverages made from containers 11 and/or the like.

The link may include at least one of: a URL (uniform resource locator), a website address, a file path and/or the like. The URL and website address are operable to direct the computing device 190 to the content stored on the server(s) 205.

The beverage information stored within the communication element 201 comprises content relating to a plurality of different beverage types. The content for each beverage type may include at least one of: the type of beverage, the trade name of the beverage, the alcoholic content of the beverage, the composition of the beverage, the manner in which the beverage is preferably served (e.g. temperature, type of drinking vessel from which a user should preferably drink it), liquids and/or solids with which the beverage is preferably not mixed, the names of other beverages and/or foods with which the beverage is preferably mixed, the temperature at which the beverage is preferably stored, the volume of beverage initially contained in a container 11, the history of the production of the beverage, other flavours of the beverage, associated beverages and/or the like. The beverage information may further comprise information relating to the specific container on which the communication element is mounted. For example, it may further comprise the container 11 issue date, the expiry date of the beverage, a unique container identification number/code or a container series number.

The advertising content may comprise details of particular products and/or services available for purchasing by the user. Preferably, the advertising content is based upon associated user information and beverage information.

The base unit comprises base-container transceiver 301 connected to an electronic circuit or control unit 303 and a base-device transceiver 302. The base-container transceiver 301 may be an RFID reader, and NFC reader, a Bluetooth (RTM) interface, a WLAN interface or the like and is operable to communicate with the communication element 201 of the container(s) 11. The base-device transceiver 302 is generally operable to communicate with the computing device 190 over relatively large distances and thus comprises a WLAN interface or a Bluetooth (RTM) interface. However, in certain embodiments the base-device transceiver 302 comprises an active NFC interface for communicating at shorter distances with the computing device 190.

The computing device 190 comprises a wireless transceiver 203. This may be, for example, a Bluetooth™ receiver/transmitter, a wifi (wireless) transmitter/receiver, a mobile data transceiver, an NFC transceiver or otherwise.

The computing device 190 is also optionally connected to and operable to transfer data with a network 204, for example the Internet. One or more computer servers 205 may also be connected to the network 204. Each server 205 comprises a memory 207, the memory 207 storing one or more databases 206. The memories 207 and/or database(s) 206 of the one or more servers 205 host at least one of: website content, advertising content, application installation software, user profiles and beverage information.

Interaction of Base Unit, Containers and Computing Device

The wireless transceiver in the computing device 190 is configured, depending upon the hardware and software if any provided upon or within the containers 11, to communicate either with the base-device transceiver 302 in the base unit 12 (a first mode of operation, as illustrated in FIG. 13), or alternatively directly with the or each container 11 (a second mode of operation, as illustrated in FIG. 14). The computing device 190 is thereby able to read the content on the communication element 201, preferably wirelessly from time to time, as need be. The computing device 190 is moreover capable, when so instructed by the software application running upon that computing device 190, to control the containers 11 to dispense beverage, either directly by instructing the container 11 to dispense a beverage using one of the principles outlined above in respect of FIG. 13, or indirectly by instructing the base unit 12 to, in turn, instruct the containers to dispense beverage. Alternatively, where the beverage dispensing arrangement is integrated with the base unit 12, the computing device 190 is capable of instructing the base unit 12 to dispense beverage from one or more container(s) 11.

However, the beverage dispensing system 10 does not require that a container 11 may only dispense beverage upon connection with the base unit 12. Instead, the beverage dispensing arrangement may be adapted such that a user can dispense fluid manually, for example by actuating the valve actuator 31 of the dispensing valve 30. The container 11 may therefore dispense beverage independently of the base unit 12 and computing device 190. Utilising the base unit 12 does, however, provide additional functionality to the beverage dispensing system 10.

Further applications of the computing device 190 in as much as it interacts with the base unit 12 and the container(s) 11 will be set out below, depending upon the form of the communication element 201.

Passive Communication Element

In a first embodiment the communication element 201 is passive and stores content only. Preferably the communication element 201 comprises a passive electronic tag. The computer device transceiver 203 and the base-container transceiver 301 are operable to obtain information from the electronic tag. More preferably the communication element 201 comprises a passive RFID (radio-frequency identification) tag and the computer device transceiver 203 and base-container transceiver 301 comprise an RFID reader. Yet more preferably the communication element 201 comprises an NFC (near field communication) tag and the computer device transceiver 203 and base-container transceiver 301 comprise an NFC reader. The transmission frequency for data transfer between the NFC reader and tag is the standard frequency of 13.56MHz.

Alternatively the passive communication element 201 comprises a linear or matrix barcode, such as a QR Code (RTM), readable by an imaging device, such as a digital camera, of the computing device 190 or base unit 12.

The computing device 190 or base unit 12 communicate with the passive communication element 201 and download the dynamic or static content from it. The base unit 12 communicates the content to the computer device 190 via the base-device transceiver 202. The computer device 190 utilises the content in an interface, as describe further below.

Semi-Active Communication Element

In a second embodiment the communication element 201 is semi-active in that its content can be changed. Preferably, the communication element 201 is a read-write RFID or NFC tag. A control unit provided in the container 11 or base unit 12 is operable to write data to the communication element. In the case of the base unit comprising the control unit 303, the docking ports comprise contacts to connect the control unit 303 with the communication element 201. A power supply, such as a battery mounted within or on the container 11 or the base unit 12, or a mains supply, provides power to the control unit.

The control unit is operable to collect data relating to the state of the beverage in the container 11. For example, the level sensing means may be connected to the control unit, which collects data relating to the volume of beverage remaining in the container 11. The control unit stores this data as content on the semi-active communication element 201.

The computing device 190 or base unit 12 communicate with the semi-active communication element 201 and download the dynamic or static content from it. The base unit 12 communicates the content to the computer device 190 via the base-device transceiver 202. The computer device 190 utilises the content in a user interface, as describe further below.

Active Communication Element

In a third embodiment the communication element 201 is active and comprises a transmitter and receiver. The communication element 201 preferably comprises a WLAN (wireless local area network) interface, a Bluetooth (RTM) interface, an active RFID tag, an active NFC tag or the like. The container 11 further comprises a control unit and memory on which the content is stored. The control unit is operable to interact via the communication element 201 with the computing device 190, either directly or via the base unit 12. The control unit may also be operable to collect data relating to the state of the beverage in the container 11, for example via a sensing means (as previously described in relation to the embodiment having a semi-active element).

The computer device transceiver 203 and base-container transceiver 301 are suitable to cooperate with the communication element 201 and comprise, for example, a WLAN interface, a Bluetooth (RTM) interface, an active RFID tag, an active NFC tag or the like.

The content stored on the memory is transmitted to a computing device 190 as previously described in relation to the embodiments having a passive or semi-active communication element 201. However, the container control unit is also operable to be controlled either directly from the computing device 190 or from the computing device 190 via the base unit 12. As previously described, this may be due to the control unit 303 in the base unit 12 being operable to control the dispensing valve 30 of the container 11. However, in an alternative arrangement, the container control unit is operable to control the dispensing valve 30 and/or the beverage dispensing arrangement. For example, the container control unit controls a solenoid operable to actuate the dispensing valve 30 or operable to actuate a valve controlling the outlet of a gas canister (as described earlier).

User Interface

Figure 15:
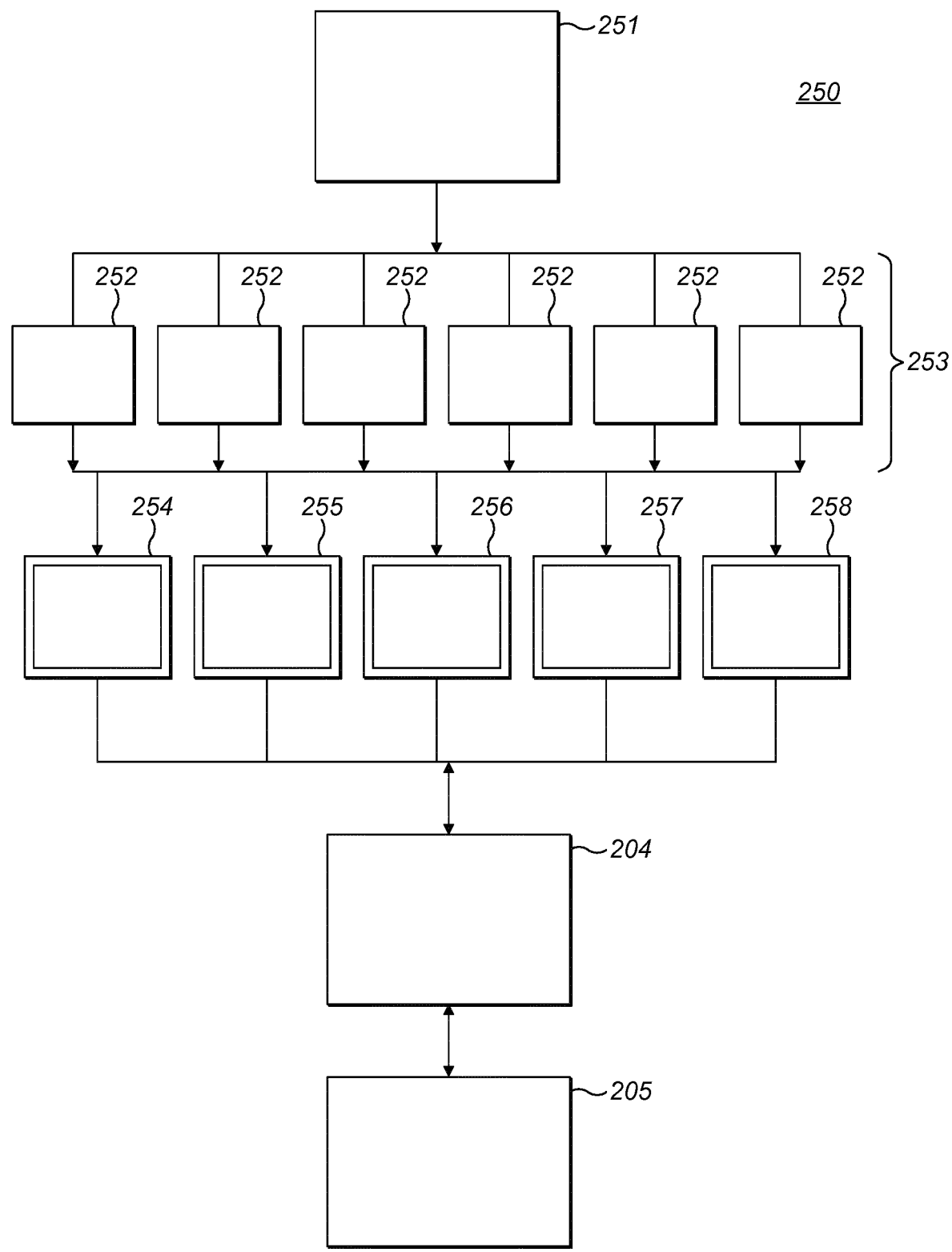
FIG. 15 is a schematic of a user interface of the present invention.

In a preferred embodiment, the network browser or application on the computing device 190 provides a user interface 250 that enables the user to interact with a website or the application. FIG. 15 illustrates a particular embodiment of a user interface 250 comprising an initial input 251. The initial input 251 may be a manual input from a user (e.g. via an input device, such as a touch screen, of the computing device 190). Alternatively, the initial input 251 may result from the reading of content stored on the communication element 201 on a container 11 by the computing device transceiver 203, either directly or via the base unit 12.

When the transceiver 203 receives the content stored on the communication element 201, software on the computing device 190 interprets the content and subsequently launches an activity. For example, the computing device 190 software may interpret a file path and subsequently launch an application stored on its memory. Alternatively, the computing device 190 interprets a URL, is directed by the URL via the network 204 to the server(s) 205, downloads application installation software from the server(s) 205, installs an application utilising the application installation software and preferably subsequently launches the application. As a further alternative, the computing device 190 interprets a website address, launches a network browser, connects to the server(s) 205 via the network 204 and subsequently downloads to the network browser the web content stored on the server(s) 205. The display device of the computing device 190 displays the website content or application.

The user interface 250 utilises the initial input 251 to select one of a plurality of beverage types 252 at a beverage selection step 253. Following the beverage selection step 253, the interface 250 provides several options for proceeding to a user that relate to the beverage type 252 selected at the beverage selection step 253.

A first option may comprise an instructor function 254 that provides suggestions to a user as to beverages that can be made utilising the selected beverage type 252. For example, the instructor function 254 may indicate beverages that can be formed by mixing the beverage type 252 with other beverages and/or food products and comprise a step-by-step guide for creating the mixed beverage. The instructor function 254 may indicate preferred presentations of the beverage type 252, such as temperature and/or drinking vessel type (e.g. type of glass). The instructor function 254 may also indicate any foods with which the beverage type 252 is preferably consumed.

The user may also be able to input into the instructor function 254 the food products and/or beverages available to the user. The instructor function 254 is operable to suggest mixed beverages that may be formed utilising these food products and/or beverages. The instructor function 254 may also suggest mixed beverages that are related to events in a calendar application on the computing device 190. The instructor function may suggest mixed beverages based upon weather information downloaded from the network 204.

Further options may comprise an online ordering function 255 through which the user can order further containers 11, a social networking function 256 for connecting the user to one or more social networks, an events function 257 via which the user can see information on events related to the beverage type 252 and a beverage information function 258. The beverage information function 258 provides beverage information to the user.

The online ordering function 255 may be operable to automatically order a further container 11 via the network 204 from a supplier when the amount of beverage remaining in the container 11 falls below a predetermined amount. The amount of beverage remaining in the container 11 is detected by the sensing means and transferred to the computing device 190, as previously described. The computing device 190 compares the data received and compares it with a predetermined value. If the data indicates that the amount of beverage in the container 11 is below a predetermined level, the order is sent to the supplier.

Each of the functions 254, 255, 256, 257, 258 may download or upload content from/to the one or more server(s) 205 via the network 204. For example, the instructor function 254 may download from the user profile the previous history of beverages prepared by the user and utilise this history to suggest further associated beverages that can be prepared. The instructor function 254 may also upload to the user profile the beverages selected for preparation by the user, thereby recording such a history. However, functionality may be provided on the computing device 190 to record this history for later access by the instructor function 254. The data captured from each user stored in the database(s) 206 may be combined with that of other users in order to assess global preferences and the like.

The user interface 250 is also operable to receive control inputs from a user. The control inputs are communicated via the computing device transceiver 203 to the container communication element 201 or to the base-device transceiver 302 of the base unit 12. The base unit control unit 303 and/or container control unit interpret the control signals, which are subsequently used to control the beverage dispensing arrangement, whether formed separately in each container 11 or integrally with the base unit 12. For example, in the embodiment where the beverage dispensing arrangement comprises a pump in the base unit 12, the control unit 303 in the base unit 12 switches the pump on and off such that a single dose of beverage is dispensed. The control signals generally indicate when to start and when to stop the dispensing of beverage; therefore a single dose, a plurality of doses or a continuous stream of beverage may be dispensed.

In addition, the user interface 250 may comprise a dispensing lock function which prevents the dispensing of beverage from the container 11 until at least one level of security has been passed on the computing device 190. For example, a passcode may need to be entered into the computing device 190 prior to the dispensing valve 30 being opened. Alternatively, the dispensing lock function may prevent the dispensing of beverage from the container 11 when a predetermined amount of beverage has been dispensed therefrom.

An exemplary method of use of the user interface 250 and beverage dispensing system 10 will now be described. A plurality of containers 11, each containing a different type of beverage, are supported by the base 12. The base unit 12 comprises a plurality of load cells, each capable of detecting the weight of a container 11. The beverage dispensing arrangement of each container 11 comprises an elastic band that pressurises the fluid in the reservoir 160. The dispensing actuator 31 comprises a proximity sensor and the dispensing valve 30 is controlled by a solenoid. A Bluetooth™ interface is also provided in each container 11. The Bluetooth™ interface, solenoid and proximity sensor are all connected to and receive power from a control unit in each container 11. Docking ports are provided between each container 11 and the base unit 12, each having one or more contacts to direct power to the control unit of each container 11.

A user opens the software application on the computing device 190, which displays the user interface 250 on the display device of the computing device 190. The software application instructs the computing device transceiver 203 to send a signal to the base-device transceiver 302 requesting beverage information from the base unit control unit 303.

The control unit 303 issues instructions to the base-container transceiver 301 to download content from each container 11 via the Bluetooth™ interface. The content relates to the type and initial amount of beverage stored in each container 11. The control unit 303 also measures the weight of each container 11 using the load cells and determines the amount of beverage remaining. Subsequently, the control unit 303 instructs the base-device transceiver 302 to communicate the beverage type, initial beverage amount and current beverage amount to the computing device transceiver 203.

The application displays the types of beverages present and the amount left in each container 11 via the user interface 250. The user can then select a beverage type 252 at the beverage selection step 253 based upon the amount of beverage left in each container 11. Once selected, the user is presented with the various functions 254, 255, 256, 257, 258. For example, if the user sees that a container 11 is almost empty, they can use the online ordering function 258 to request delivery of another container 11 from a supplier. Alternatively, the user can select the beverage information function 258 to view content relating to the types of beverage present.

The user can select the instructor function 254 to determine what mixes of drinks are available to him based upon the types and amounts of beverages detected by the base unit 12. The user can input the various food products available to him/her, such as lime or lemon. The user interface 250 also determines the user's preferred drinks from the user's profile, stored either on the computing device 190 or on the server 205. The user interface 250 also requests and receives the current time from the computing device 190 and determines the beverages suitable for drinking at that point in time. The instructor function 154 interprets this information and displays a number of mixed beverages that the user can make in an order of preference based upon the current time, the food products available and the user's most commonly made mixed beverages.

The user can then select the mixed beverage they wish to make. The instructor function 254 then displays the recipe in the order required for making the selected mixed beverage. The recipe is transmitted to the base unit 12 by the computing device 190. The base unit 12 communicates with the relevant container 11, instructing its control unit to actuate the solenoid when its proximity sensor is activated. The control unit will only actuate the solenoid when the user places a drinking vessel appropriately for receiving beverage from the correct container 11. The elastic band pressurises the beverage against the dispensing valve 30, such that once the dispensing valve 30 is opened beverage is driven out of the reservoir 160. The solenoid opens and closes the dispensing valve 30 such that the dose indicated in the recipe is dispensed.

The user is directed to each container 11 required for the mixed beverage by the user interface 250 and the base unit control unit 303 sequentially sends instructions to each container 11. Once the relevant beverages have been added to the drinking vessel, the user can complete the mixed beverage by adding food products indicated by the user interface.

Additional Devices

Other devices may also be connectable to the base unit 12 and/or controllable by the control unit in the base unit 12. For example, a device may be provided that is capable of storing and/or making ice. An alternative exemplary device is operable to aid the user in the creation of a mixed beverage. The mixing device comprises an inlet for a user to pour the components of a mixed beverage into. The mixing device may comprise means to shake beverage contained within it, motion sensors operable to detect the movement of the beverage and control means operable to optimise the movement of the shaking means in accordance with the beverage being created. The mixing device may also comprise a temperature sensor connected to control means that provides a temperature output to a user. The temperature output may be provided, for example via the base unit 12, to a computing device 190 for the user to read. The mixing device may further comprise heating and/or cooling means to adjust the temperature of the mixed beverage. The mixing device may further comprise level sensing means to detect the amount of beverage poured into it and provide an indication of the amount to the user, for example on the computing device 190 or on the mixing device itself.

Method of Providing Beverages to a User

The present invention further provides a method of providing beverages to a user. Initially the computing device 190 receives beverage information content from the communication element 201. The user interface 250 selects a beverage type based upon the beverage information content received. The user selects the online ordering function 255 and an order is made for a new container 11. The beverage order may be associated with the beverage information content on the communication element 201. If the beverage information content indicates that the beverage in the container 11 has fallen below a predetermined level, the online ordering function 255 may automatically make the order.

The order is transmitted from the computing device 190 to a supplier via the network 204. The supplier subsequently retrieves the new container 11, in which the dispensing valve 36 is in the locked position. The container 11 is packaged and delivered to the user via, for example, a postal system. The user unpacks the container 11, unlocks the dispensing valve 36 and dispenses beverage from the container 11.

As is apparent, the beverage dispensing system 10 of the present invention provides flexibility as to how beverage is dispensed; the user can manually dispense the beverage using the dispensing actuator 30, or beverage can be dispensed via an input on a computing device 190, which can be communicated to the container 11 either directly or via the base unit 12. Therefore the beverage dispensing system 10 may be employed in various environments, such as in private residences, bars or restaurants. The system 10 is particularly suitable for being integrated into a digital environment in a hotel room or other business-to-consumer environments. Furthermore, due to their lightweight and strong construction, the containers 11 are particularly suitable for use on airlines.

The invention claimed is:

1. A beverage dispensing system, said system comprising:
   (a) a plurality of beverage dispensing containers, each container comprising:
      a reservoir containing a beverage;
      a container outlet that dispenses the beverage from the reservoir into a drinking vessel separately to any other container outlet;
      a wireless communication element having storage means for storing data indicative of contents of a particular beverage dispensing container;
   (b) a mobile computing device configured to run a software application providing a user interface configured to provide a mixed beverage recipe thereon, said recipe being associated with at least a first and a second different beverage and respective beverage amount data, the first and second different beverage being, respectively, in first and second beverage dispensing container of the plurality of containers;
   (c) a base unit upon or within which, in use, the plurality of containers are positioned, the base unit further comprising:
      a plurality of base-container transceivers for wirelessly reading data from and writing data to the wireless communication elements;
      at least one base-device transceiver for wirelessly communicating data with the mobile computing device;
      a control unit for controlling communication of data from the mobile computing device to the wireless communication elements and vice-versa, and
      an input to receive instructions from a user;
   (d) a beverage dispenser in communication with the input of the base unit and control unit and with the reservoir of at least the first and second beverage dispensing containers, the beverage dispenser comprising an electro-mechanical structure including an electrically-driven pump that directs beverage from the reservoir and out of the container, the beverage dispenser being configured to cause beverage to be dispensed from at least the first and second beverage dispensing containers of the plurality of containers when instructions to do so have been received from the user via the base unit input or from the user interface;

wherein the beverage dispensing system is configured to direct a user sequentially between a respective container outlet of at least the first and second beverage dispensing containers of the plurality of containers in accordance with the mixed beverage recipe.

2. A system as claimed in claim 1 wherein the data stored on the wireless communication element comprises at least one beverage information selected from a group consisting of the type of beverage stored in the reservoir, user profiles, advertising content, a link and/or other data concerning one or more of an identity of the beverage in that container, a serial number, a current volume and/or weight of beverage in the container, a sale date, a volume of beverage dispensed, a number of individual beverage doses dispensed, and a sale location.

3. A system as claimed in claim 1 wherein the wireless communication element comprises a re-writable near field communication tag and the plurality of base-container transceivers comprise an near field communication transceiver.

4. A system as claimed in claim 1 further comprising a network connected to at least one server, the mobile computing device is connected to and operable to transfer data with each server via the network, and each server comprises a memory, the memory storing one or more databases.

5. A system as claimed in claim 4 wherein memories and/or database(s) of the at least one server host at least one selected from the group consisting of website content, advertising content, application installation software, user profiles and beverage information.

6. A system as claimed in claim 1 wherein the base unit comprises one or more level sensing means for determining a level of beverage remaining in each of the plurality of containers.

7. A system as claimed in claim 6 wherein the one or more sensing means comprises load cells provided on a support surface to detect weight of each one of the plurality of containers.

8. A system as claimed in claim 6 wherein the one or more level sensing means is connected to the control unit of the base unit and the control unit is operable to collect amount data from the one or more level sensing means representative of an amount of beverage remaining in the plurality of containers.

9. A system as claimed in claim 8 wherein the control unit is operable to write the amount data to the wireless communication element.

10. A system as claimed in claim 1 wherein at least one laser emitting diode light is provided to indicate when beverage is being dispensed from the plurality of containers and/or when the amount of beverage in the plurality of containers falls below a predetermined level.

11. A system as claimed in claim 1 wherein the base unit comprises a substantially planar support surface on which the plurality of containers rest.

12. A system as claimed in claim 1 wherein the plurality of containers comprise side, front and rear walls together defining substantially rectangular cuboid form.

13. A system as claimed in claim 1 wherein the plurality of containers are shaped and sized to fit through a domestic letterbox.

14. A system as claimed in claim 13 wherein a height of the plurality of containers are selected from the group consisting of no greater than 400 mm, no greater than 280 mm, no greater than 230 mm and wherein the thickness of the container is selected from the group consisting of no greater than 35 mm and no greater than 30 mm.

15. A system as claimed in claim 1 wherein the reservoir contains an alcoholic beverage.

16. A method of operating the beverage dispensing system as claimed in claim 1,
wherein the method comprises:
communicating, from the wireless communication elements to the base unit and vice-versa, beverage data indicative of contents of the plurality of beverage dispensing containers; and
communicating said beverage data from the base unit to the mobile computing device.

17. A method as claimed in claim 16 wherein the beverage data stored comprises at least one beverage information selected from a group consisting of the type of beverage stored in the reservoir, user profiles, advertising content, a link and/or other data concerning one or more of the identity of the beverage in that container, a serial number, a current volume and/or weight of beverage in the container, a sale date, a volume of beverage dispensed, a number of individual beverage doses dispensed, and a sale location.

18. A method as claimed in claim 16 wherein the beverage data is communicated from the base unit to the mobile computing device in response to a user input to the mobile computing device.

19. A method as claimed in claim 16 further comprising a step of determining an amount of beverage in the plurality of containers using load sensing means in the base unit and storing the amount as beverage amount data on the base unit.

20. A method as claimed in claim 19 further comprising the step of communicating the beverage amount data to the wireless communication element and/or the mobile computing device.

21. A method as claimed in claim 16 further comprising providing a user interface on the mobile computing device.

22. A method as claimed in claim 21 further comprising providing a mixed beverage recipe on the user interface, said recipe being associated with a types of beverage in the plurality of containers and/or the beverage amount data associated with the plurality of containers.

23. A method as claimed in claim 22 further comprising directing a user to the plurality of containers in accordance with the mixed beverage recipe.

24. The system according to claim 1 wherein the user interface provides instructions to the control unit of the base unit for making mixed beverages from the reservoirs of the plurality of containers, wherein the control unit selects a first beverage from a first reservoir of the plurality of containers and selects at least one second different beverage from at least a second different reservoir from the plurality of containers and dispenses the first and the at least second beverages according to the instructions into a drinking vessel.

25. The system according to claim 1 wherein each container further comprises a bottom end and a front wall, the bottom end located in the base unit, the container outlet located on the front wall.

26. The system according to claim 1 wherein each container includes a structural support located about a perimeter of the reservoir and shaped to enable adjacent containers of the plurality to stack next to or on top of one another.

* * * * *